US012754895B1

(12) United States Patent
Holt

(10) Patent No.: US 12,754,895 B1
(45) Date of Patent: Oct. 6, 2026

(54) MEMETIC DATABASE

(71) Applicant: Holtwork LLC, Incline Village, NV (US)

(72) Inventor: Brian Holt, Incline Village, NV (US)

(73) Assignee: Holtwork LLC, Incline Village, NV (US)

( * ) Notice: Subject to any disclaimer, the term of this patent is extended or adjusted under 35 U.S.C. 154(b) by 0 days.

(21) Appl. No.: 19/411,308

(22) Filed: Dec. 7, 2025

Related U.S. Application Data

(63) Continuation-in-part of application No. 19/317,067, filed on Sep. 2, 2025, which is a continuation-in-part of application No. 18/814,486, filed on Aug. 24, 2024, now Pat. No. 12,475,098.

(60) Provisional application No. 63/837,824, filed on Jul. 2, 2025, provisional application No. 63/805,943, filed on May 14, 2025, provisional application No. 63/760,077, filed on Feb. 18, 2025, provisional application No. 63/534,798, filed on Aug. 25, 2023.

(51) Int. Cl.
*G06F 16/22* (2019.01)
*G06F 40/205* (2020.01)

(52) U.S. Cl.
CPC ........ *G06F 16/2237* (2019.01); *G06F 40/205* (2020.01)

(58) Field of Classification Search
CPC .................................................. G06F 16/2237
USPC .......................................................... 707/737
See application file for complete search history.

(56) References Cited

U.S. PATENT DOCUMENTS

| | | | | |
|---|---|---|---|---|
| 6,990,442 | B1 * | 1/2006 | Davis | G06F 40/211 704/9 |
| 8,548,758 | B1 | 10/2013 | Foley | |
| 10,853,062 | B1 * | 12/2020 | Holt | G06F 8/38 |
| 11,409,521 | B2 | 8/2022 | Holt | |
| 2006/0282429 | A1 | 12/2006 | Hernandez-Sherrington et al. | |
| 2013/0232143 | A1 * | 9/2013 | Ait-Mokhtar | G06F 16/211 707/E17.014 |
| 2016/0110121 | A1 | 4/2016 | Singh et al. | |
| 2018/0046638 | A1 | 2/2018 | Qiu et al. | |
| 2020/0110818 | A1 | 4/2020 | Garcia Guirado | |
| 2022/0147253 | A1 * | 5/2022 | Sajeepa | G06F 3/065 |

FOREIGN PATENT DOCUMENTS

| | | |
|---|---|---|
| WO | WO20250493350 | 3/2025 |

OTHER PUBLICATIONS

International Search Report for PCT Application PCT/US24/43763, mailed Dec. 16, 2024.

(Continued)

*Primary Examiner* — Muluemebet Gurmu
(74) *Attorney, Agent, or Firm* — Clause Eight; Michael Catania

(57) ABSTRACT

Computer-implemented techniques for representing, storing, retrieving, and reasoning over knowledge are disclosed herein. One aspect is an axis-lattice query language paradigm that turns every query string into a rectangular Matrix→Vector→Limit→Data tensor whose shape is dictated by token position. The invention improves the operations of a computing device by increasing the amount of significant information manipulated per unit of time by a processor.

15 Claims, 25 Drawing Sheets

(56) References Cited

OTHER PUBLICATIONS

International Written Opinion for PCT Application PCT/US24/43763, mailed Dec. 16, 2024.
Office Action for U.S. Appl. No. 18/814,486, mailed Jun. 3, 2025.

* cited by examiner

| ID | A | R | B |
|---|---|---|---|
| 1 | Orson Wells | actor | ROLE1 |
| 2 | Citizen Kane | movie | ROLE1 |
| 3 | Kane | character | ROLE1 |

FIG. 3

| ID | A | R | B |
|---|---|---|---|
| 7 | actor | COL | ROLE |
| 8 | movie | COL | ROLE |
| 9 | character | COL | ROLE |

| ID | TEMPLATE | POPULATED |
|---|---|---|
| actor | The actor $actor plays the character $character in the movie $movie. | The actor *Orson Wells* plays the character *Kane* in the movie *Citizen Kane*. |
| movie | The movie $movie stars {the actor $actor as the character $character}. | The movie *Citizen Kane* stars the actor *Orson Wells* as the character *Kane* and *Joseph Cotton* as *Jedediah Leland*. |
| character | The character $character is played by {the actor $actor in the movie $movie}. | The character *General Dreedal* is played by the actor *Orson Wells* in the movie *Catch-22 (1970)* and the actor *Peter Guinness* in *Catch-22 (2019)*. |

FIG. 5

```
NEW  $STR
NAM  $AID  $RID  $STR
NUL  $LID
SET  $AID  $RID  $BID  ($QNT)
DEL  $AID  $RID  $BID
```

FIG. 12

%AID %RID %BID

FIG. 13

[A R B Q / V] F [A R B Q / V]

FIG. 14

{ [ . ] [ARB ] [ 1 ] }

FIG. 15 t = A [ C ] D ] B = t 1.0 <= meter [ height ] ride ] allow = t

FIG. 20

R1 = A1 R2 [ R3 R4 > A4

FIG. 21

ACTOR = "ORSON WELLES" MOVIE [ MOVIE

R1 = A1   R2 = A2   @@1 = @2

R1 = A1   R2 = A2   ##2 = #1

FIG. 23

| #AXIS: 0: 3 | #AXIS: 0: 2 | #AXIS: 0: 1 | #AXIS: 0: 0 | |
|---|---|---|---|---|
| roles | * | actor | "Orson Welles" ; | #AXIS: 1: 0 |
| *(blank)* | *(blank)* | movie | * ; | #AXIS: 1: 1 |
| *(blank)* | !@ | @ | @ ; | #AXIS: 1: 2 |
| *(blank)* | *(blank)* | actor | * ; | #AXIS: 1: 3 |

FIG. 24

| **#AXIS: 0: 2** | **#AXIS: 0: 1** | **#AXIS: 0: 0** | |
|---|---|---|---|
| roles | actor | :$a="Orson Welles" ; | **#AXIS: 1: 0** |
| *(blank)* | movie | _ ; | **#AXIS: 1: 1** |
| @ | @ | @ ; | **#AXIS: 1: 2** |
| *(blank)* | actor | ! = $a ; | **#AXIS: 1: 3** |

FIG. 25

MEMETIC DATABASE

CROSS REFERENCES TO RELATED APPLICATIONS

The Present Application is a continuation-in-part of U.S. patent application Ser. No. 19/317,067, filed on Sep. 2, 2025, which is a continuation-in-part of U.S. patent application Ser. No. 18/814,486, filed on Aug. 24, 2024, now U.S. Pat. No. 12,475,098, issued on Nov. 18, 2025, which claims priority to U.S. Provisional Patent Application No. 63/534,798, filed on Aug. 25, 2023, now expired, and U.S. patent application Ser. No. 19/317,067 claims priority to U.S. Provisional Patent Application No. 63/837,824, filed on Jul. 2, 2025, U.S. Provisional Patent Application No. 63/805,943, filed on May 14, 2025, and U.S. Provisional Patent Application No. 63/760,077, filed on Feb. 18, 2025, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention relates to computer-implemented techniques for representing, storing, retrieving, and reasoning over knowledge. It particularly concerns (i) knowledge-graph and database architectures, including relational, graph, hybrid No-SQL stores, and document-search systems; (ii) artificial-intelligence tooling such as computer-learning models, artificial neural networks, and large language model (LLM) retrieval-augmented generation (RAG) pipelines that consume or emit said knowledge; and (iii) the formal underpinnings that govern these systems, encompassing computer-programming languages, category theory, type theory, modal and other formal logics, database theory, graph theory, relational algebra, and associated metalanguages.

Background

Conventional computer-implemented information systems employ several distinct data models, each accompanied by its own storage structures, query languages, and reasoning techniques. In the relational model, data are stored in normalized tables addressed by the Structured Query Language (SQL), a declarative language codified in successive editions of the ISO/IEC 9075 standard. Key-value stores, column-family stores, and document databases relax strict normalization to accommodate variable-schema records and high write throughput.

Graph-oriented stores treat information as vertices linked by directed edges. Property-graph databases assign labels and key-value properties to both vertices and edges; commercial implementations provide traversal operations that evaluate adjacency patterns with short execution times even on large, partitioned graphs. The Graph Query Language (GQL) standard defines data-definition and query constructs for property graphs and incorporates features pioneered by vendor dialects such as Cypher and PGQL. Cypher adopts an ASCII-art pattern-matching syntax, whereas Gremlin, specified by the Apache TinkerPop project, supplies an imperative traversal language that can be executed step by step. Other client-facing query technologies, such as GraphQL, project sub-graphs over heterogeneous back ends by allowing a requester to specify the shape of the desired response.

The World Wide Web Consortium's Resource Description Framework (RDF) expresses facts as subject-predicate-object triples. The SPARQL Protocol and RDF Query Language (SPARQL) provides declarative constructs for graph-pattern matching, federated joins across distributed endpoints, and update operations. Ontology languages that extend RDF, including the Web Ontology Language (OWL), enable the definition of class hierarchies, property characteristics, and logical constraints that support automated classification and consistency checking.

Symbolic knowledge-based systems predate many of the foregoing web and graph standards. One representative example is the Cyc project, which maintains a curated ontology comprising typed predicates, micro-theories, and inference rules encoded in the CycL language. Cyc's rule-engine applies deductive, abductive, and default reasoning to derive conclusions from asserted axioms. Logic-programming languages such as Prolog and Datalog likewise manipulate facts and rules, evaluating Horn clauses through resolution or semi-naïve bottom-up algorithms.

In parallel with symbolic approaches, vector-embedding databases store high-dimensional numeric vectors that represent words, sentences, images, or other artifacts in continuous latent spaces. These stores implement approximate-nearest-neighbor algorithms to answer similarity queries and are frequently employed to retrieve context for large language models in retrieval-augmented generation pipelines. Emerging products embed vector representations inside graph nodes, thereby combining topological structure with semantic proximity.

Although each of the foregoing technologies addresses specific workload requirements, practitioners confront persistent difficulties. Schema and logic remain fragmented across relational, document, property-graph, triple, and vector stores; equivalent facts are duplicated in multiple grammatical or directional forms; inverse-relationship traversals and class-hierarchy reasoning can incur significant run-time cost; and data pipelines that move information between symbolic knowledge structures and sub-symbolic embeddings introduce brittleness and latency. As a result, constructing a single system that stores data compactly, executes graph and logical queries efficiently, and supplies concise, unambiguous context to artificial-intelligence models remains a challenging task.

BRIEF SUMMARY OF THE INVENTION

The present invention describes efficient and flexible methods of storing, computing, and communicating knowledge.

One aspect of the present invention is an axial grammar paradigm that parses into a lattice whose shape is dictated by token position. Low-character separators and positional cues replace the verbose keywords and quoted identifiers of conventional languages, shrinking multi-clause queries to a handful of symbols. Results are optionally emitted in the same syntax so downstream prompts can chain queries without re-serialization, reducing context-window usage. Concise pointer dereference tokens inline joins and filters, further trimming token count, lowering per-token entropy, and localizing attention.

Another aspect of the present invention is a deterministic compiler framework that defines a rectilinear query language built on a fixed lattice. It unifies the semantics of tables and graphs yet can expand to higher dimensions when required. The compiler parses each statement in a single pass into rectangular matrices whose matrix, vector, and limit extents map directly to GPU-aligned tensors. Variables bind to coordinates at parse time, so substitutions resolve through constant-time indexing instead of late-bound joins. Wildcards and difference markers are desugared into a minimal operator set during scanning, which simplifies execution. The engine then serializes results back in the same query grammar, turning every output into immediate, valid input. This feedback loop removes intermediate result formats, supports recursive analytics, allows lossless translation to SQL and SPARQL, enables storage as fixed-width disk pages, and provides forward-compatible extension to hyper-dimensional data models without schema redesign.

In one embodiment, the present invention improves the operations of a computing device by increasing the amount of significant information stored per unit of space on non-transitory computer-readable storage medium. In one embodiment, the present invention improves the operations of a computing device by increasing the amount of significant information manipulated per unit of time by a processor. In one embodiment, the present invention improves the operations of a computing device by reducing the amount of redundant, meta, and otherwise insignificant information stored/processed in the device.

In another embodiment, the present invention is used to train a large language model.

In another embodiment, the present invention is used in a large language model retrieval-augmented generation pipeline. A user inputs a natural-language query, the LLM transcribes that query into a programmatic query, the programmatic query is executed against a datastore, then the results are emitted to the user, optionally in structured data form, natural language form, or in markup form. The present invention reduces the token count, and thus LLM compute costs, of the generating programmatic query and reading datastore results. Further the present invention enables a lower-parameter count LLM to accurately generate more complex queries, further reducing compute costs.

In another embodiment, the present invention is a component of a neural network.

In another embodiment, the present invention provides responses to queries made to virtual assistants or chatbots such as OpenAI® ChatGPT™, Apple® Siri®, or Amazon® Alexa®.

In another embodiment, the present invention provides responses to search engine queries.

In another embodiment, the present invention stores business information, such as customer relationship management (CRM) data, and provides business intelligence responses and metrics.

In another embodiment, the present invention is used for inventory management and product assembly. A factory stores a number of components from suppliers. Each supplier's component is related to a component type. The component type is related to information necessary for the placement of that component with others in an assembly, such as size, weight, and connection elements. Factory robots access this information in order to correctly manipulate and build a given assembly. The present invention stores such information for a hierarchy of components for modular assembly. For example, a certain integrated circuit (IC) from a supplier is related by the present invention to an IC type specifying the number of pins and mounting type of surface-mount technology (SMT) or through-hole technology (THT). A factory robot accesses those details and physically mounts that IC to a printed circuit board (PCB) accordingly. The assembled PCB is then considered a modular component that is related to a certain type in the present invention. The factory robot then accesses the details for this modular component type to connect the PCB to a 3D-printed plastic form using certain nuts and bolts at certain points. The robot continues to recursively assemble larger modules until the product is complete.

In another embodiment, the present invention is implemented on a blockchain. A given identifier is associated with permissions for one or more blockchain addresses to cryptographically sign messages which create, update, or delete information associated with that identifier. Messages are recorded by mining servers which authenticate, timestamp, and broadcast these messages. Optionally, the miners periodically group messages into blocks and cryptographically sign or hash these blocks. Optionally, multiple blockchains coexist with certain identifiers only existing on a subset of the blockchains.

Inquiries regarding the present invention may be emailed to the info@holtwork.com address.

BRIEF DESCRIPTION OF SEVERAL VIEWS OF THE DRAWINGS

FIG. 3 illustrates a column/row ARB data relationship.

FIG. 5 illustrates a human language template populated by ARB data.

FIG. 2 illustrates a computer-readable storage medium (CRSM) efficiently storing ARB data.

FIG. 12 illustrates a command scheme for manipulating data.

FIG. 13 illustrates an ARB logic notation.

FIG. 14 illustrates another ARB logic notation.

FIG. 15 illustrates another ARB logic notation.

FIG. 20 illustrates an ACDB logic notation.

FIG. 21 illustrates a key-value-like logic notation.

FIG. 23 illustrates an alternate variable system for FIG. 21.

FIG. 24 illustrates an axial grammar and syntax.

FIG. 25 illustrates an extended axial grammar and syntax.

DETAILED DESCRIPTION OF THE INVENTION

Those skilled in the art will recognize the included drawings provide only a few illustrative examples of possible embodiments of the present invention. It is to be understood that the scope of the present invention includes the many combinations, modifications, and embodiments that may be derived from these drawings. Elements of these drawings are conceptual representations of computer processes which those skilled in the art will recognize as a combination of computer software and hardware. Certain similar elements are given the same reference number across drawings, it is to be understood that aspects of these elements may differ somewhat according to the needs of the particular embodiment.

Unless otherwise indicated, "comprising" is used in an open, non-limiting sense, "or" is inclusive, and the singular includes the plural and vice versa. The techniques described herein may be implemented as a method, as a system comprising one or more machines, and/or as instructions stored on a non-transitory computer-readable medium executed by one or more processors. Any feature described with respect to one embodiment may be combined with any other feature or embodiment where technically compatible, and omissions of features are expressly contemplated. Operations may be performed in the order shown, in a different order, or in parallel, while achieving substantially equivalent results. Deployments may be on-device, on-premises, in cloud or edge environments, single- or multi-tenant, and may include encrypted storage and transport with role-based access control.

Those skilled in the art will recognize this code may be embodied in many equivalent forms and the form below is but one illustrative embodiment. Further, those skilled in the art will recognize the precise machine execution of this code will vary from system to system and may be optimized for various factors.

Figure 1:
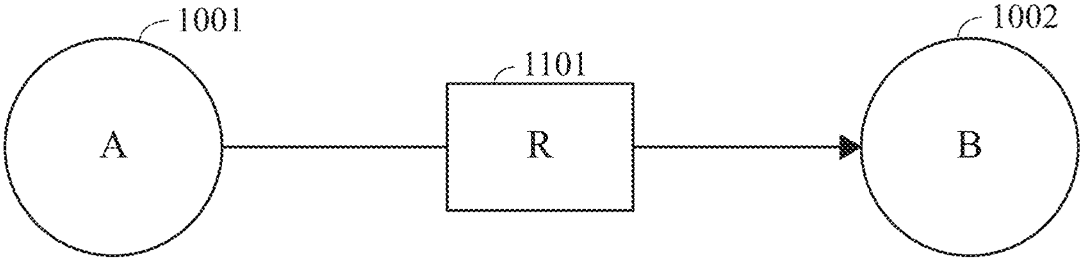
FIG. 1 illustrates a graphical ARB data relationship.

FIG. 1 illustrates a basic ARB meme. In this example, some element A 1001 has some relation R 1101 to some other element B 1002. In one embodiment, this graph is transcribed as (A R B). In one example, A 1001 represents Alice, R 1101 represents parent, and B 1002 represents Bob, which could be verbalized as "Alice is the parent of Bob." The A 1001 and B 1002 elements typically represent nouns such as people, places, things, ideas, and categories thereof. These elements may be proper nouns or common nouns. The same element may be used in an A 1001 or B 1002 position based on the specific R 1101. The R 1101 typically represents a verb or verb phrase such as "is the parent of" or "has headquarters at" or "is a kind of." The R 1101 has a specific direction such that the A 1001 and B 1002 are not necessarily swappable. Each ARB is logically unique such that no additional information is learnt from adding an identical ARB meme. Each ARB may be termed a meme or a triplet. In conventional computer terminology, an ARB may be termed a specific form of a row, or a specific form of a tuple.

In one embodiment, A 1001 and/or B 1002 represents an internal identifier with no semantic meaning outside the system. For example, a row identifier, fact identifier, meme identifier, or primary key.

Figure 2:
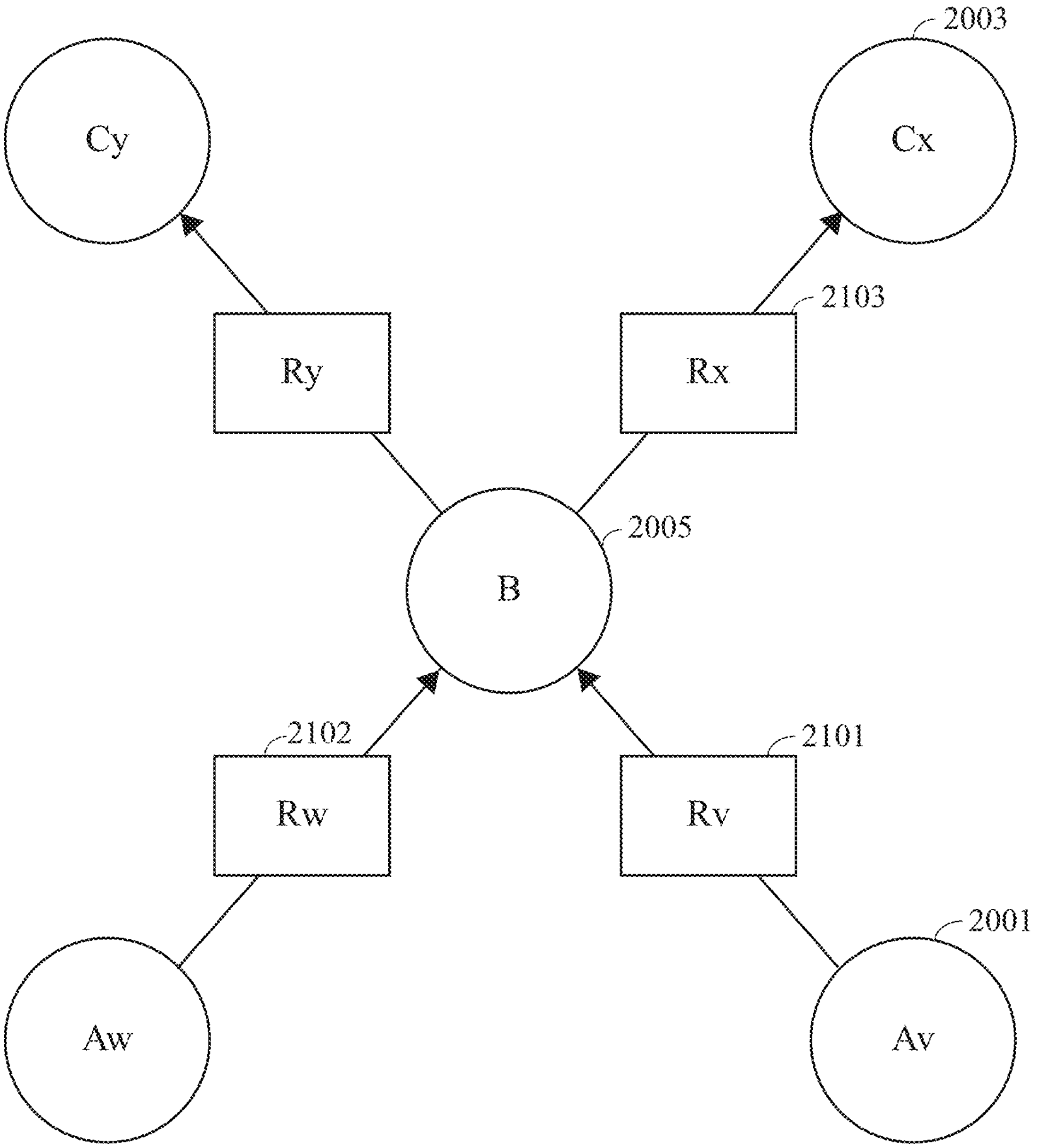
FIG. 2 illustrates a complex graphical ARB data relationship.

FIG. 2 shows a graphical representation of an ARB memeplex. In one embodiment, this graph is transcribed as (Av Rv B; Aw Rw B; B Ry Cy; B Rx Cx). In this example, Av 2001 is connected to B 2005 by an Rv 2101 relation. The B 2005 value is further connected to the Cx 2003 element through an Rx 2103 relation.

In one embodiment, the Rv value 2101 equals the Rw value 2102, indicating the same relationship. In another embodiment, the Rv value 2101 differs from the Rw value 2102, indicating the distinct relationships. Any given A value is optionally connected to one or many RB pairs. Any given B value is optionally connected to one or many AR pairs.

In one example, the Rx 2103 is verbalized as a phrase linking two sentences or clauses; for example, "as cited by" or "according to."

In a hierarchical embodiment, the B element represents one scale of information larger than the A elements. In this embodiment, A elements and B elements typically do not exist on the same hierarchical level of the graph. Likened to a graph database, the A element is analogous to a node and the B element is analogous to a graph. Likened to a relational database, the A element is analogous to a cell and the B element is analogous to a row. Likened to a neural network, the A element is analogous to a neuron and the B type is analogous to a network.

In one embodiment, an A element represents a letter or a group of letters (i.e. tokens), while a B element represents a word, name, or short phrase. In another embodiment, an A element represents a word, name, or short phrase, while a B element represents a sentence or clause. In another embodiment, an A value represents sentences and clauses, while a B element represents a long multi-clause sentence, multiple sentences, or a paragraph. In another embodiment, an A element represents a paragraph while a B element represents an article or page. In yet another embodiment, these levels are layered together, such that a B value represents a word, a C value represents a sentence, a D value represents a paragraph, and so forth. It is to be understood that the methods disclosed herein are applicable at many ARB scales and should not be limited to the given example scale.

In a heterarchical embodiment, there are no graph levels and there is no distinction between the scale of the A elements and B elements. This paradigm forms a graph/network structure.

In one embodiment, an ARB is associated with a sequence number (first, second, third, etc.) for display or execution purposes. In one embodiment, an ARB is associated with a weight value similar to a synapse weight in a neural network (e.g. a value between zero and one). The weight optionally indicates the strength of belief in the R relationship between that particular A and B.

FIG. 3 shows a column/row representation of an ARB data relationship. The data shown represents a sentence akin to "Orson Welles acts as the character Kane in the movie Citizen Kane." Collectively, these describe a movie role. The first column represents an identifier for each ARB. The second column represents an A value. The third column represents an R value. The fourth column represents a B value. Each ARB here has the same B value, indicating they are associated with the same role. The first ARB indicates that Orson Welles is the actor. The second ARB indicates that Citizen Kane is the movie. And the third ARB indicates that Kane is the character.

In this example, the A, R, and B values are words for ease of understanding. In an alternate embodiment, A, R, and B are identifiers which are associated with human language words stored elsewhere. The identifiers are optionally numeric or alphanumeric.

Embodied in SQL, the A, R, and B are optionally stored as integer identifiers in a table described as: CREATE TABLE 'ARB' (A' BIGINT (20) UNSIGNED NOT NULL, 'R' BIGINT (20) UNSIGNED NOT NULL, 'B' BIGINT (20) UNSIGNED NOT NULL, UNIQUE KEY (A, R, B));

One SQL query for getting all ARBs for memes associated with one A value SAID from this table is: SELECT*FROM 'ARB' WHERE 'B' IN (SELECT 'B' FROM 'ARB' WHERE A=SAID);

In an alternate embodiment, the present invention uses a no-SQL database engine such as MongoDB, key-value store such as Redis, or wide-column database engine such as Cassandra. In an alternate embodiment, the present invention uses a purpose-built database engine. Ideally, a purpose-built database engine would be optimized for the specific data storage requirements and queries of the present invention.

Figures 4A, 4B:
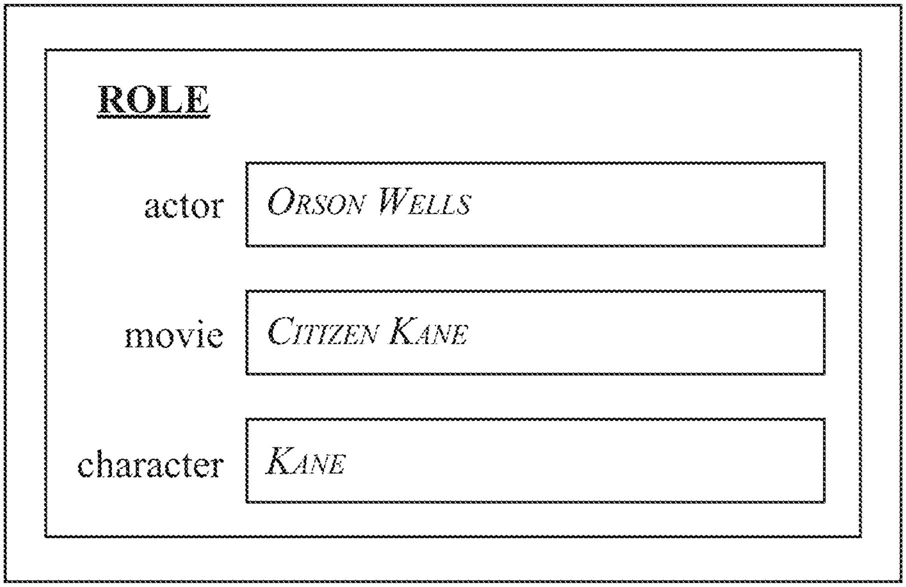
FIG. 4A illustrates a column/row representation of an ARB metadata.
FIG. 4B illustrates an input form based on the metadata in FIG. 4A.

FIG. 4A shows a column/row representation of an ARB metadata. Metadata describes how standard ARB data is inputted or outputted. This metadata forms a meta table with meta columns which is used in entering, displaying, and retrieving the data from FIG. 3. The A values in FIG. 4A correspond to the R values from FIG. 3. The R values here indicate a meta column relationship. And the B value of ROLE connects each column to one meta table. This metadata is optionally stored in the same database table (or equivalent) as the main data or it is optionally stored in a different database table.

FIG. 4B shows an entry form based on the metadata in FIG. 4A. In this example, a user enters the data that will populate FIG. 3. Optionally, new elements are given an incremental id number using a command such as SQL's LAST INSERT ID ( )

FIG. 5 shows a human language template populated by a meme's data. The first column shows an identifier. The second column shows a human language template. The template comprises variable signifiers associated with R values which will be populated with the paired A value from the meme. Typically, the variable signifier comprises an identifier associated with the R value and optionally one or more special characters; here they are formed as dollar sign and R name. The third column shows the template populated with meme data to form a sentence. The first row is a template verbalized from the perspective of one A value associated with the actor R value. The template is populated with meme data from FIG. 3 to form a sentence. The second row is a template verbalized from the perspective of one A value associated with the movie R value. Optionally, this template combines multiple memes from the same meta table (FIG. 4A) having the same A value paired with the movie R value. When combining memes into one sentence, the clause in curly brackets is repeated for each meme. In this case, the non-subject actor and character variables are in the curly brackets, and that clause is repeated twice in the sentence for the two character-actor AR pairs in the meme. It is to be understood that template formatting is arbitrary where characters such as the dollar sign or curly brackets may be replaced by other characters. Optionally, the templates are encoded in a markup language such as HTML or Markdown.

Figure 6:
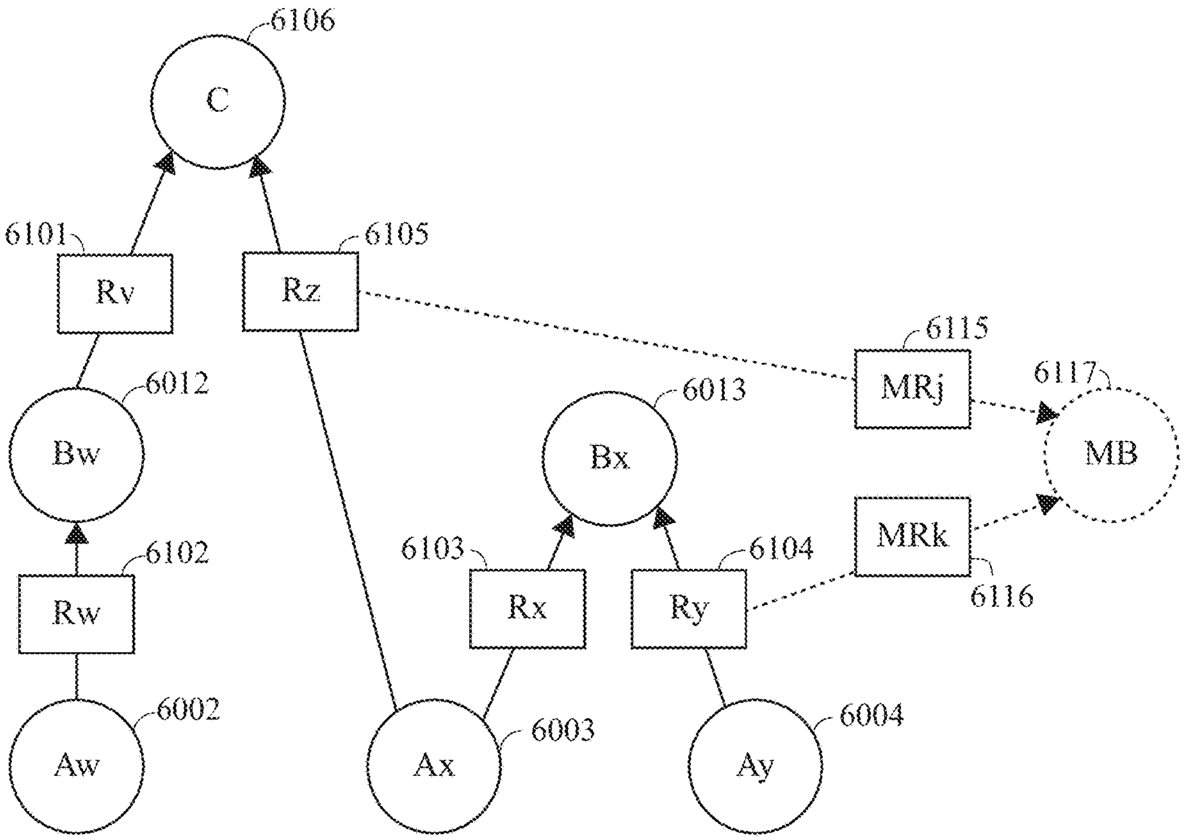
FIG. 6 illustrates a dynamic ARB relationship using meta relationships.

FIG. 6 shows a graphical representation of a dynamic ARB relationship using meta relationships. This example dynamically creates a relation between the Ay 6004 and the C 6106 without previously having an ARB written to CRSM. This creates a logic pattern that can be reused. The Aw 6002 is related by Rw 6102 to Bw 6012. The Bw 6012 is related by Rv 6101 to C 6106. C 6106 is inversely related by Rz 6105 to Ax 6003. The Ax 6003 is related by Rx 6103 to Bx 6013. The Rz 6105 is also meta related by MRj 6115 to the meta MB 6117. The MB 6117 is related by MRk 6116 to Ry 6104. The graph is transcribed in one embodiment as (Aw Rw Bw; Bw Rv C; Ax Rz C; Ax Rx Bx; Ay Ry Bx; Rz MRj MB; Ry MRk MB).

Upon execution, the program searches for ARBs where the B type equals the C value 6106. One result ARB comprises Ax 6003, the Rz 6105, and C 6106. The program stores the Ax value 6003.

The program searches for meta ARBs (mARBs) where the A type equals the second Rz value 6105. One result mARB comprises Rz 6105, MRj 6115, and MB 6117. The program stores the MB value 6117.

The program searches for mARBs where the B type equals the MB value 6117. One result mARB comprises Ry 6104, MRk 6116, and MB 6117. The program stores the Ry value 6104.

The program searches for ARBs where A equals Ax 6003. One result ARB comprises Ax 6003, Rx 6103, and Bx 6013. The program stores the Bx value 6013.

The program searches for ARBs where the R type equals the third Ry value 6104 and the B type equals Bx 6013. This effectively searches for the unknown Ay value 6004 connected to the known Ry value 6104 and the known Bx value 6013. One result ARB comprises Ay 6004, Ry value 6104, and Bx 6013. The program stores the third Ay value 6004. Now the third Ay value 6004 can be used to inform the C 6106.

Here the term "stores" typically indicates reading the value from a slower CRSM and writing the value to a faster CRSM. For example, the program reads from an HDD and records to RAM. Or, for example, the program reads from RAM and records to the processor's cache. The term "search" indicates reading from a CRSM.

In certain embodiments, the ARB relationships are conceptualized as a hierarchy and mARB relationships are conceptualized as an intersecting perpendicular hierarchy.

In one embodiment, these meta relationships describe logical relationships such as family (e.g. parent, child, cousin) or group (e.g. kingdom, phylum, order, class, genus, species). This allows the program to search or display logically related information for a given element without having to permanently store logically redundant ARB relationships.

Figure 7:
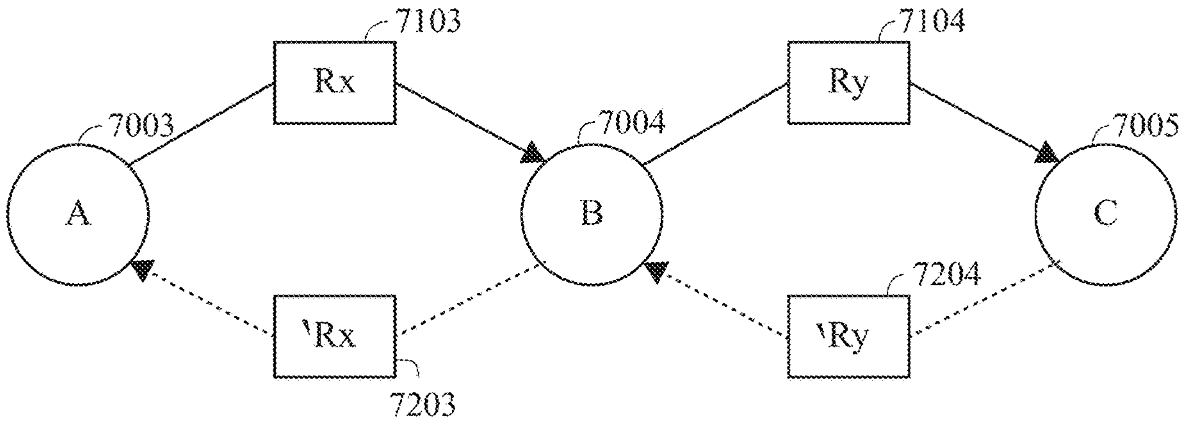
FIG. 7 illustrates an inverse ARB relationship.

FIG. 7 illustrates inverse relations in an ARB system. A first A 7003 is related to a B 7004 by Rx 7103. This implies an inverse relationship of B 7004 relating to A 7003 by Rx 7203. The 'Rx 7203 is the logical inverse of Rx 7103, for example parent-child/child-parent or movie-role/role-movie. The B 7004 is also related to C 7005 by Ry 7104 and an implied inverse 'Ry 7204. The implied relations are optionally written to a CRSM, or optionally programmatically derived from the explicit relationships.

In one embodiment, each relationship identifier number shares a mathematical relationship to its inverse relationship's identifier number. Optionally, the inverse relationship identifier number is plus or minus X of the relationship identifier number. Alternatively, the inverse relationship identifier number is multiplied or divided by X (where X may be negative) of the relationship identifier number. Alternatively, the inverse relationship identifier flips one bit from the identifier binary. A mathematical relationship between relations allows the system to quickly calculate the inverse of any given relationship identifier. In one embodiment, a first relationship is given a lower even number identifier and its inverse relationship's identifier is one greater, giving it a higher odd number; thus an inverse relation can be calculated as:

SINVERSE=(SRID % 2)?(SRID−1):(SRID+1);

In one embodiment, a first user has permission to add an Rx 7103 relationship to the A 7003, but the system does not show the 'Rx 7203 relationship for the B 7004. This allows the first user to have permissions to modify data related to the A 7003 element, but not the B 7004 element. Optionally, a second user is permitted to add relationships to the B 7004 element, but not the A 7003 element. Optionally, the second user is presented with a message to accept or reject an 'Rx 7203 according to a Rx 7103. For example, the second user is presented with a message such as, "FirstUser has added this role to the movie Citizen Kane, would you like to add Citizen Kane as the movie in this role?"

In one graph theory interpretation of this paradigm, each A represents a node and each R represents an edge. Each unique Ridentifier represents a directed graph. And for each Ridentifier, there is a reverse directed graph 'R. The database as a whole represents a set of directed R graphs for a set of A nodes.

Figure 8:
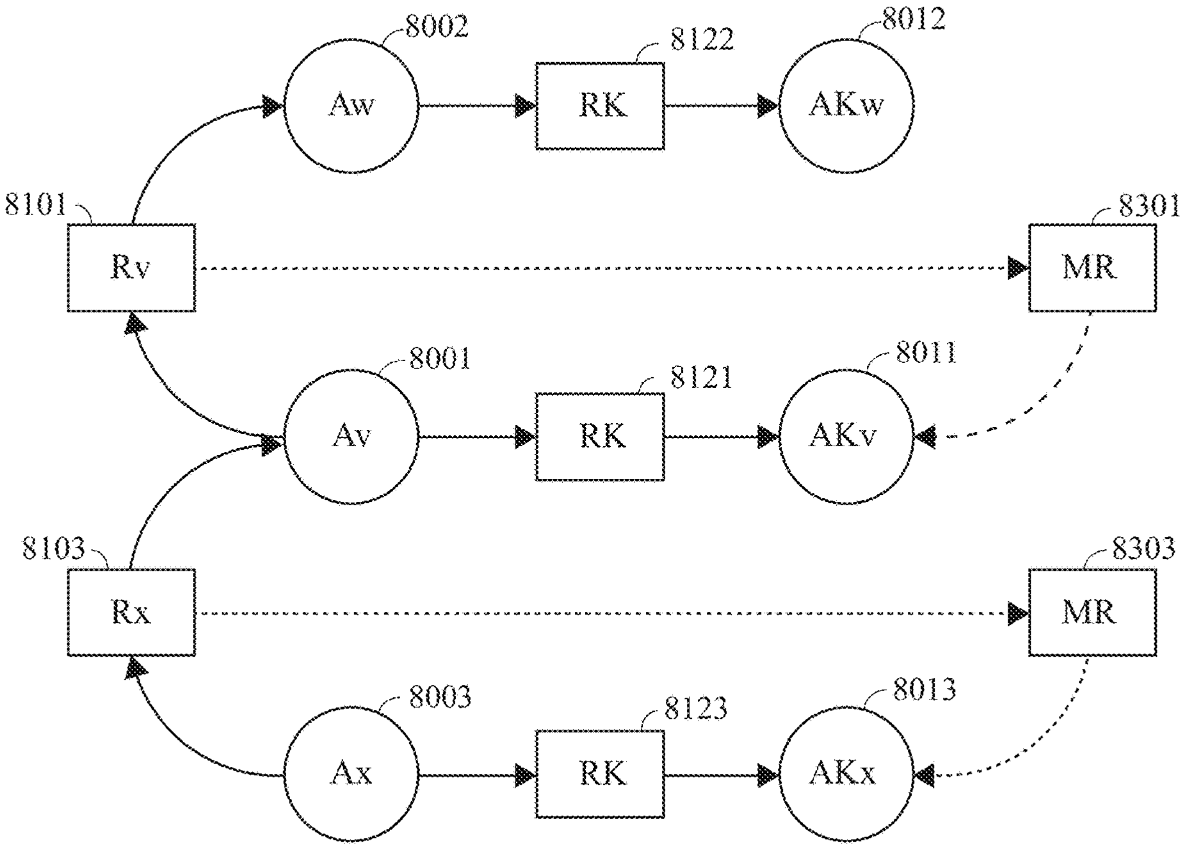
FIG. 8 illustrates business logic and meta relationships.

FIG. 8 illustrates an ARB paradigm with business logic using kinds and meta relationships. The Av 8001 is related to the Aw 8002 by Rv 8101. The Av 8001 is also inversely related to Ax 8003 by Rx 8103. The Av 8001 is also related to AKv 8011 by RK 8121. The Aw 8002 is also related to AKw 8012 by RK 8122. The Ax 8003 is also related to AKx 8013 by RK 8123. The Rv 8101 is related to the AKv 8011 by a first meta relationship MR 8301. The Rx 8103 is related to the AKx 8013 by a second meta relationship MR 8303. For clarity, this figure omits the implied inverse relationships. Here, AKv represents a specific type of A termed a kind and RK represents a specific relationship for designating kind. Here kind is akin to type or category or class, where analogous As are related to the same kind. In one embodiment, a kind is a common noun such as person, actor, movie, character, species, color, digital camera, retailer, verb, government agency, or company. For example, both Citizen Kane and Ferris Bueller's Day Off are both related to the kind movie. Optionally, one A is related to multiple kinds. In one embodiment, each kind itself is an A related to a specified kind A with a specific identifier such as 123. In one embodiment, the RK has a specific identifier such as 456. Meta relationships (8301 and 8303) are used to enforce logic and data integrity. In one embodiment, the meta relationship allows/prevents an A of a certain kind to have certain relationships. For example, the meta relationship allows a "movie-role relation" to related to an A which is related to a movie kind, while preventing non-movies from having this relationship, through programmatic logic. Enforcing such selective relationships prevents erroneous relationships from being made.

FIG. 2 illustrates one embodiment of a computer-readable storage medium (CRSM) efficiently storing ARB data.

Block 9001 illustrates a CRSM storing ARB data grouped by A value. Each cell is a fixed length, for example, each cell is 8 bytes forming a 32 byte ARB row. The rows are stored sequentially on the medium without needing structuring data or dividers.

Block 9002 illustrates a CRSM storing ARB data grouped by B value. This is a duplicate set of data rearranged for the inverse relation such that the B values are in the A position. Upon manipulating the primary ARB meme, this duplicate meme is similarly manipulated. In one embodiment, Bs in 9002 are grouped with As of equivalent value in 9001.

Block 9003 illustrates a CRSM storing ARB data grouped by R value.

In one embodiment, rows are grouped by the indexed identifier prefix in Huffman coding. In another embodiment, row identifiers are indexed in a skiplist. In another embodiment, row identifiers are indexed using a hash index. In another embodiment, row identifiers are indexed using a B-tree or variant thereof. In another embodiment, row identifiers are indexed using an LSM tree. In another embodiment, rows are indexed and/or grouped using an R-tree. Optionally row placement on the CRSM corresponds to the index.

In one embodiment, rows are indexed to a definite A value such that writing the A value in each row is redundant, and thus the A cell is omitted for each row. In one embodiment, the set of rows where A=SAID are distributed across a plurality of groups and at least one group has empty rows to allow for new A=SAID memes to be quickly written without rearranging groups of data on the CRSM.

In one embodiment, the dataset is stored on multiple CRSMs connected by computer network.

Optionally, each row includes additional metadata such as a row identifier or a created/modified timestamp.

Optionally, each row includes a Q cell, which is optionally a floating-point number. In one embodiment Q=true is given a specific numeric value (such as 1 or 0.00001) so it may be stored in the same format as numeric Qs.

Groups may also be referred to as "pages" or "blocks" or "shards."

One embodiment is optimized for querying for all memes associated with one identifier SAID, analogous to the SQL query: SELECT*FROM 'ARB' WHERE 'A'=SAID OR 'B'=SAID;.

Figure 10:
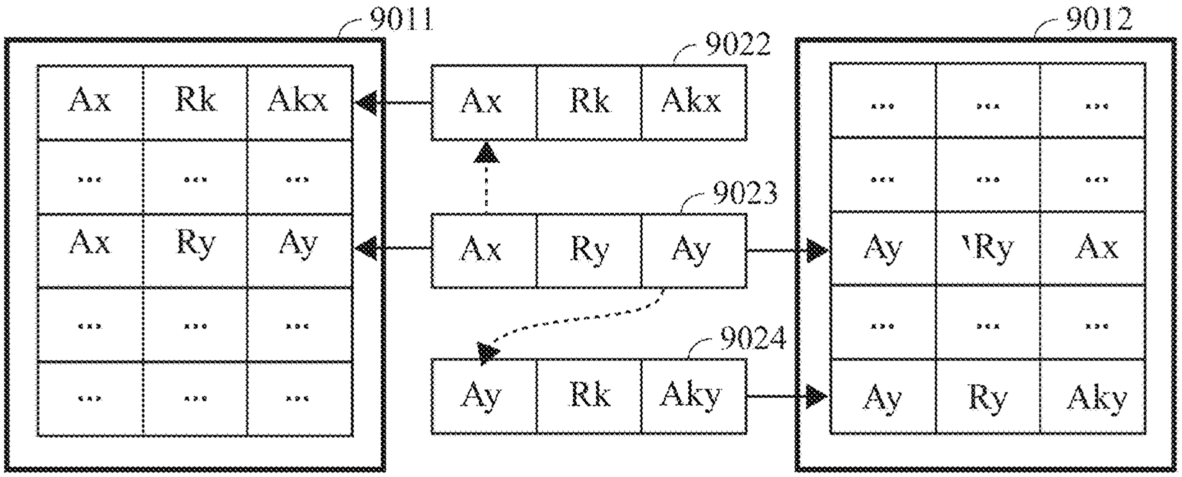
FIG. 10 illustrates ARB data sharded over multiple shards.

FIG. 10 illustrates one embodiment of ARB data sharding. A shard is a dataset written to at least one location on at least one computer-readable storage media (CRSM). Ideally, sharding data decreases read time and/or decreases the load on one CRSM. Optionally, multiple shards are stored on one CRSM. Optionally, one shard is stored on multiple CRSMs. The left column represents a first shard 9011. The right column represents a second shard 9012. The data in the center (9022, 9023, 9024) represents ARB data. At block 9022, a first row indicates Ax is related to a first kind Akx by relation Rk. At block 9023, a second row indicates Ax is related to Ay by relation Ry. At block 9024, a third row indicates Ay is related to a kind Aky by relation Rk. Rows are assigned a shard by inputting the associated kind into a sharding function. The sharding function is a deterministic mathematical function that receives a large A identifier input and returns a smaller shard identifier output. Preferably, the number of possible sharding function outputs equals the number of shards in the system. Optionally the shard function comprises a hash function such as MD5 or SHA256, or optionally the shard function comprises an arithmetic function such as division or modulus. For example, the shard function performs a modulus 10 operation in order to select one of 10 possible shards; so an A identifier of 12345 would be assigned the shard identified by 5. The first row 9022 is directly related to kind Akx, and kind Akx is assigned to the first shard 9011. To assign a shard for the second row 9023, programmatic logic finds the kind associated with the A identifier Ax. The second row's 9023 A identifier equals the first row's A identifier, which is related to the kind Akx. Thus, the second row 9023 is also assigned to the first shard 9011. All data with the A identifier Ax is stored on one shard for optimal reading. This process is repeated for the B identifier so that all data for a given identifier (in the A and B position) is stored in one shard. Optionally, an ARB row is stored in an inverted form such as: the B identifier in the A position, the inverted R identifier in the R position, and the A identifier in the B position. In one embodiment, the ARB row and inverted ARB row are both stored, optionally on the same or different shards.

Figure 11:
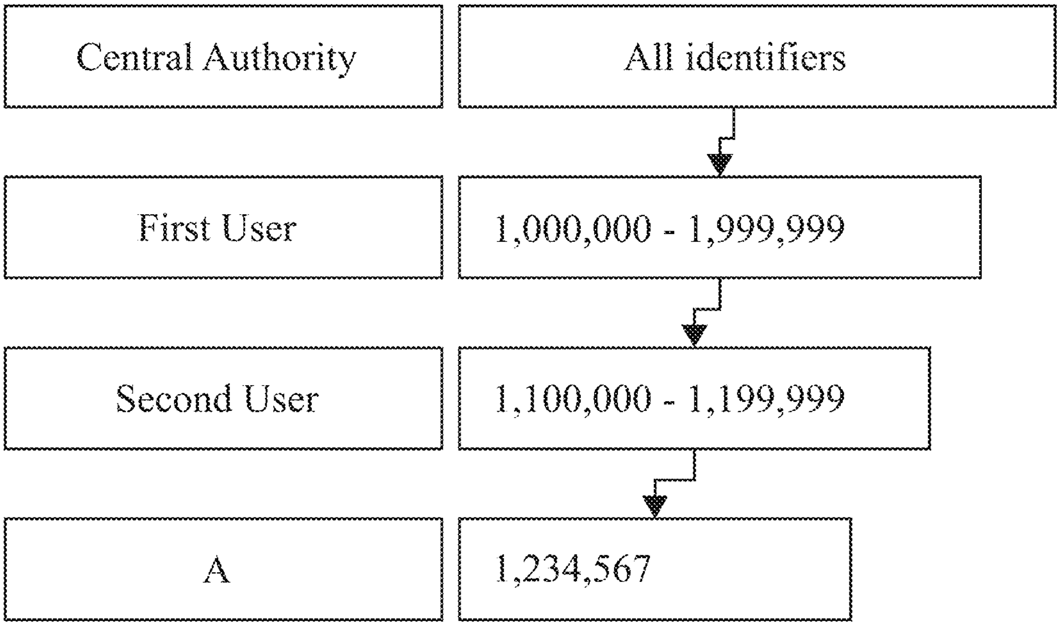
FIG. 11 illustrates an identifier assignment scheme.

FIG. 11 illustrates an identifier assignment scheme in a distributed embodiment. Typically, each A element has a unique identifier. To avoid identifier conflicts, wherein two users independently identify the same identifier to two distinct A elements, a central authority assigns identifiers to users. Users optionally subassign identifiers to other users. In one example, a first user sends a request to the central authority asking for one million identifiers; the central authority responds with a range of identifiers such as 1,000,000 through 1,999,999; the first user then subassigns the range 1,100,000 through 1,199,999 to a second user; the second user then identifies the identifier 1,234,567 to a given A element. In one embodiment, when a third user queries the central authority as to who owns the identifier 1,234,567, then the central authority replies with an indicator associated with the second user as the first user had previously notified the central authority of the subassignment. Alternatively, the central authority replies with an indicator associated with the first user, who when queried by the third user, replies with an indicator associated with the second user. In one embodiment, a record of identifier assignments is publicly available on a blockchain. Optionally, the central authority cryptographically signs a message assigning identifiers to a user's indicator. Optionally, the indicator is itself an identifier or is optionally a blockchain address. In one embodiment, the identifiers are requested and assigned via API calls to servers operated by the central authority. Optionally, the central authority assigns a sequential range of identifiers or optionally a single identifier. This scheme does allow for two different users to identify different identifiers to the same conceptual A element. While redundant, this prevents one user from adding unauthorized relationships to another user's data. Optionally, two different identifiers for the same conceptual A element are merged such that one identifier effectively replaces the other. Optionally, a new ARB is added wherein A is the unused identifier, R signifies a merger, and B is the used identifier; this relationship can be used to redirect requests from the unused identifier to the used identifier. The central authority keeps a record of identifiers assigned out and the user keeps a record of identifiers to which it was assigned.

Optionally, identifiers are assigned according to a modulus, for example a user is assigned identifiers where X>=ID % Z>=Y.

FIG. 12 represents one embodiment of API calls used for manipulating data. The exact embodiment of these commands is arbitrary. These commands are optionally formatted in JSON, YAML, HTTP query, REST, or other structured data formats. In one embodiment, these represent messages written to a blockchain.

NEW $STR
NAM @AID SRID $STR
NUL @AID SRID $STR
DAT @AID SRID $BID (SONT)
DEL @AID SRID $BID

Here SSTR represents a string name associated with an A. The SAID SRID and $BID are associated with an A, R, and B identifiers respectively. The NEW command selects and unused identifier for @AID, sets a string as the primary name for @AID, and outputs @AID. The NAM (add name) command associates additional string names with an @AID where the SRID describes the type of name (e.g. formal, informal, long, short, English, Japanese, etc.). The NUL (nullify name) command deletes a name. Alternatively, NAM returns a SLID identifier which is passed to NUL. The DAT (data) command adds an ARB relationship. The DEL command removes an ARB relationship. Further optional commands may be added for convenience, such as a command to wipe all data associated with an identifier, or a command to merge two identifiers by changing all values of a first identifier into a second identifier. Preferably, each @AID SRID $BID is unique as having duplicate ARB relationships typically does not provide additional information. Optionally, each ARB is given a SDID identifier. The optional SONT value is a real number quantity of $BID when $BID represents a unit. For example, the @AID value represents light, the SRID value represents speed, the SBID value represents the unit meters per second and the SONT value is 299792458.

Figure 13:
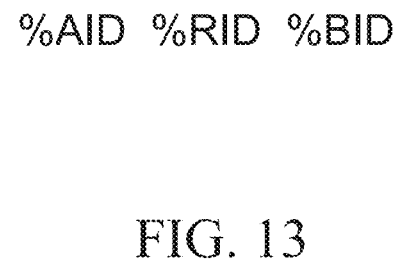

FIG. 13 illustrates one notation of an ARB logic system. This notation is optionally interpreted by a computer program, executed as a scripting language, transcoded into a programming language, or compiled as executable code. This format optionally expresses meta relationships described above.

| AID | RID | BID | QNT |
|---|---|---|---|
| USRF | KIND | USER | |
| USRF | BAL | UNIT | 123 |
| USRT | KIND | USER | |
| USRT | BAL | UNIT | 456 |
| TRN | KIND | TRNS | |
| TRN | UTO | USRT | |
| TRN | UFRM | USRE | |
| TRN | AMT | UNIT | 99 |
| % AID | KIND | TRNS | |
| @AID | AMT | UNIT | % AMT |
| @AID | UFRM | % USRF | |
| @USRF | BAL | UNIT | % BALF |
| @BALF | #EALB | @AMT | |
| @BALF | #LESS | @AMT | |
| @USRF | BAL | UNIT | @BALF |
| @AID | UTO | % USRT | |
| @USRT | BAL | UNIT | @BALT |
| @BALT | #MORE | @AMT | |
| @USRT | BAL | UNIT | @BALT |

Rows without symbols or with only @ symbols store an ARB triplet, optionally short-term or long-term depending on the embodiment. Rows containing one or more % symbols read matching ARB triplets from storage and set the % variable to the read value(s) from that column, where the value may be one or more identifiers (typically for A, R, and B) or decimal numbers (typically for QNT). The value of a variable is later accessed by replacing the % with an @, so a variable set with % AMT is later read with @AMT. Rows containing #in the R column perform a math, logic, and/or programmatic function as named. Certain functions alter A according to ONT, for example #LESS performs subtraction as A-ONT and #MORE performs addition as A+=QNT. Other functions perform a comparison of A and B and error if true/false; for example, #EALB (error if A less than B) evaluates A<B and errors if true.

The above code creates a TRN (transfer) where USRF (user-from) transfers 99 UNITs to USRT (user-to). The system checks that USRF has a BAL (balance) greater than the amount transferred. The system deducts the amount transferred from USRF's BAL and credits the amount transferred to USRT's BAL. For illustration, the logic is shown here below the TRNS, however typically the logic would be stored above the TRNS and triggered upon adding a new TRNS.

In another example:

| AID | RID | BID |
|---|---|---|
| BRAND | FLD | PROD |
| WDGT | KIND | PROD |
| WDGT | BRAND | MYCO |
| % AID | % RID | % BID |
| @AID | KIND | % KND |
| @RID | % FLD | @KND |
| @FLD | #EALB | FLD |

This code enforces data typing such that only certain kinds can have certain relations. The first line defines BRAND (product brand) as a FLD (field) of PROD (product). The second line defines WDGT (widget) as a KIND of PROD. The third line sets WDGT's BRAND as MYCO. The next lines will enforce that AID=WDGT is appropriate for RID=BRAND. The fourth line matches any ARB and sets the % AID, % RID, and % BID variables accordingly. The fifth line looks up the KINDs related to @AID, and sets % KND as an array of matching identifiers. The sixth line looks up matching @RID, SFLD, @KND triples and sets % FLD to the RIDs. The seventh line errors if @FLD does not contain FLD. In this case, WDGT-BRAND-MYCO matches to WDGT-KND-PROD which matches to BRAND-FLD-PROD and therefore does not error.

The above logic expressed in pseudocode:

```
list ($AID, $RID, $BID)=get (*, *, *);
$KND=search (SAID, KIND, *);
foreach ($KND as $kid) {$FLD
   =get ($RID, *, $kid);
   if ($FLD==FLD) return true;}
exit ('ERROR');
```

In one embodiment, the lines containing logic are stored as ARB triplets with specific kinds indicating their functions.

In one embodiment, this technique is used in a Hyperpiler (Holt, U.S. Pat. No. 10,942,709, for a Hyperpiler, is hereby incorporated by reference in its entirety) wherein the ARB data comprises the specification entities and the logic comprises the ruleset. Optionally, Hyperpiler segments are stored as strings associated with identifiers.

In certain embodiments, additional columns are added. In one embodiment, a column holds a number representing analogous to weight in a neural network. In another embodiment, a column further describes QNT such as equals, greater than, or less than.

In one embodiment, the $ @ symbols are omitted. Standard AID and BID identifiers are integers. The use of A-Z characters denotes a variable. The first use of a variable denotes "set" and later uses denote "read."

Figure 14:
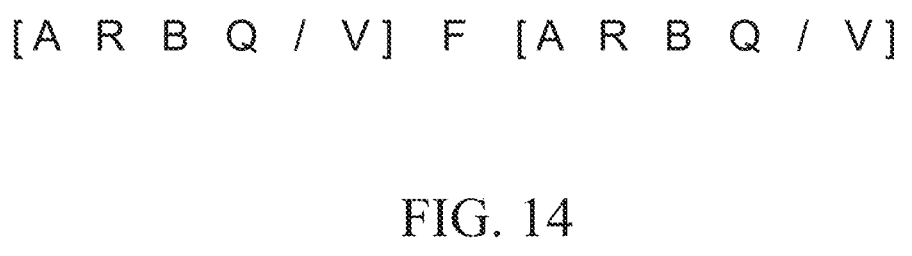

FIG. 14 illustrates an alternate notation of an ARB logic system. This notation is optionally interpreted by a computer program, executed as a scripting language, transcoded into a programming language, or compiled as executable code. This format optionally expresses meta relationships described above. Those skilled in the art will recognize this code may be embodied in many equivalent forms and the form below is but one illustrative embodiment. Further, those skilled in the art will recognize the precise machine execution of this code will vary from system to system and may be optimized for various factors.

[ARBQ/V]F [ARBQ/V]A query is wrapped in brackets. The first four terms are the query A, R, B, and Q values. Each of those values is optionally a wildcard character, such as a period. Missing ending terms are typically considered wildcards. The next term is the operator, wherein a forward slash indicates to output the value set by last term. The last term is the output term, which is A, R, B, or Q. The F is a function that compares or operates on the two queries. Comparison functions-such as equal to, greater than, less than, array comparisons, or similar-evaluate to true/false typically throw an error on false. Mathematical functions-including add, subtract, multiply, divide, and similar-modify the left query's Q according to the right query's Q. Further, a write function adds a new specified right query meme foreach returned left query meme.

The system searches the data for memes matching the query and returns one or more values of the output term. The SQL equivalent of the query [A R B Q/V]is below. Typically, wildcard values would be omitted from the where clause.

SELECT V FROM 'dat' WHERE aid=A AND rid=R AND bid=B AND qnt-Q;

In a special case, a query specifying only one term, which is also the output term, returns that term as a constant with no actual data querying necessary; for example [ . . . 0/Q/returns zero. Typically, this is done for units or quantities.

Queries are optionally nested: [[A R . . . /B]R B/B]

Here the internal query returns a B value which is used as the A in the external query. Recurring use of the same nested query in one statement is optionally treated as a variable, wherein the output value is stored in memory and does not need to be required for the same statement.

Similar rules to those described above are embodied in this format as:

[[. KIND TRNS/A]USRF/B]BAL/Q]>=[[. KIND TRNS/A]AMT/Q][[.

KIND TRNS/A]USRF/B]BAL/Q]-[[. KIND TRNS/A]AMT/Q][[.

KIND TRNS/A]USRT/B]BAL/Q]+ [[. KIND TRNS/A]AMT/Q][.

BAL/Q]>=[ . . . 0/Q][.

BAL/B]=[ . . . . UNIT/B][.

KIND USER/A]W [[. KIND USER/A]BAL UNIT 0]

The first line requires that balance of the user-from in a transfer must be greater or equal to the user's balance. The second line decreases the user-from's balance. The third line increases the user-to's balance. The fourth line requires that a user's balance must be greater or equal to zero. The fifth requires the balance is denominated in UNITs. The sixth line creates a balance of zero for a user upon the creation of that user.

Figure 15:
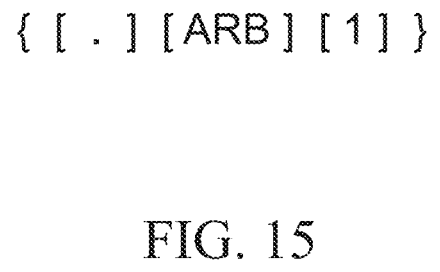

FIG. 15 illustrates an alternate notation of an ARB logic system. This notation is optionally interpreted by a computer program, executed as a scripting language, transcoded into a programming language, or compiled as executable code. This format optionally expresses meta relationships described above. Those skilled in the art will recognize this code may be embodied in many equivalent forms and the form below is but one illustrative embodiment. Further, those skilled in the art will recognize the precise machine execution of this code will vary from system to system and may be optimized for various factors.

Memes specify relations between elements.

[A R B]A meme stating that some A has some relation R to some B.

[A R B Q]The property R of some A is Q quantity of B units. Q is default NULL or a specified real number.

[[A]=w][R]=x][B1=y][Q1=z]]Alternate syntax.

Sets contain memes.

[A R.]The set of memes having some A with some relation R to any B. Dot and undefined are wildcards.

[ . . . (>0)]The set of memes having a quantity greater than zero.

Sequences manipulate sets of memes.

{[Ax Rx Bx Qx][Ay Ry By Qy]}Sequence. A "for each" loop is applied to each set, left to right. Ends on empty set.

{[ . . . ][A]R1 B1 Q1][A2 R2 B2 Q2]} Left values populate numbered variables to the right.

{[ . . . ][A . . . ][A . . . ]} An unnumbered variable is populated from previous set.

{(A1=w) (R1=x) (B1=y) (Q1>=z) (A2=B1)} Alternate syntax. Variables are automatically grouped into queries.

{[ . . . ][B1 ('R1) A1 Q1]} Every relation has an implied inverse relation ('R).

{[. balance.][. recipient A1][A2 amount.][A1 R1 B1 (+Q3)]} Example of accumulating transactions into a balance.

{[+R 'New element'][A1 . . . ]} Create a new named element, return the element's ID.

{Rx Ry Rz}=={[. Rx.][B Ry.][A1 Rz B2]} The left term is an abbreviation for the defined "logic box."

Commands interact with sets

{[ . . . >} Output all memes in the set (default).

{[ . . . 0]} The set must contain zero memes, or error.

{[ . . . 1]} The set must contain exactly one meme, or error.

{[ . . . 2]} The set must contain at least one meme, or error.

{[ . . . <]} Write all memes in the set.

{[ . . . ! ]} Delete/falsify all memes in the set.

{[ . . . +]} Sum all Q's in the set.

{[ . . . *]} Multiply all Q's in the set.

{[ . . . @]} Count memes in set.

{[ . . . ][@]} Alternate syntax.

Unities compare sequences.

<< {X} {Y} {Z} >>Given the first sequence, all following sequences are equivalent. An empty first sequence means always equivalent. Equivalent sequences are listed by preference.

<< {{[.]} {[ . . . ]{[ . . . ]} {[ . . . ]} {[.][.]]>>Dots are equivalent to undefined <<{[W∈R][X∈R]} {[W+X]} {[X+W]} >>Commutative property of addition << {[X!=L][Y!=M][Z!=N]} {[X Y Z]} {[L M N][X Y Z]} >>Non-sequitur terms Special relations.

<< {[Rx=('Rx)]} {Rx Rx} {[. Rx.][B1 Rx Al]} >>Rx is mutual.

{Rx Ry ('Ry)} Rx is a sibling relation with respect to Ry.

One sequence optionally comprises a breadth-first search (BFS). BFS is an algorithm for searching a tree data structure for a node that satisfies a given property. It starts at the tree root and explores all nodes at the present depth prior to moving on to the nodes at the next depth level.

Another sequence optionally comprises a depth-first search (DFS). DFS is an algorithm for traversing or searching tree or graph data structures. The algorithm starts at the root node (selecting some arbitrary node as the root node in the case of a graph) and explores as far as possible along each branch before backtracking.

Figure 16:
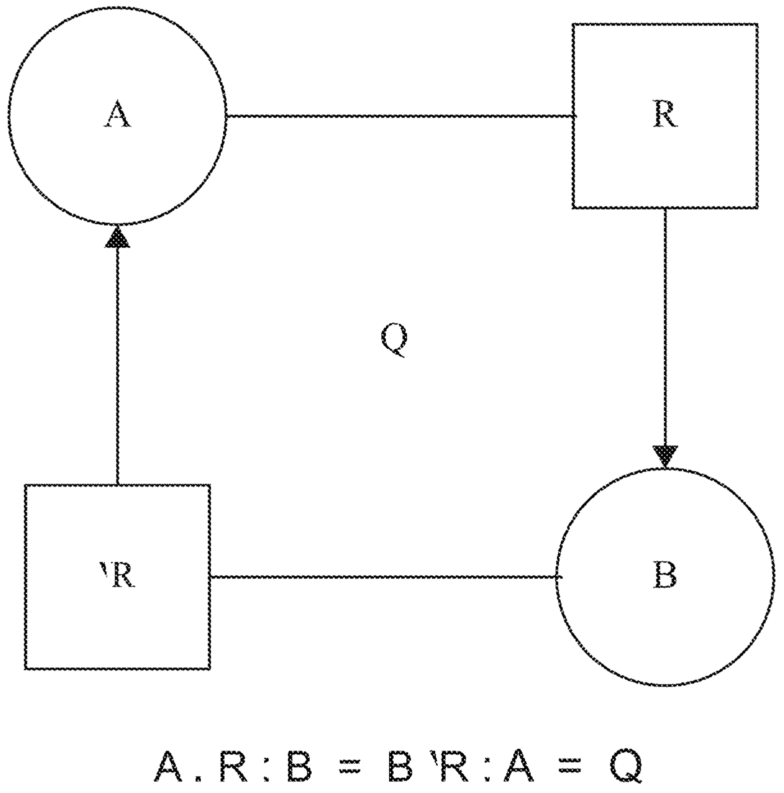
FIG. 16 illustrates another ARB logic notation.

FIG. 16 illustrates an alternate notation of an ARB logic system. This notation is optionally interpreted by a computer program, executed as a scripting language, transcoded into a programming language, or compiled as executable code. This format optionally expresses meta relationships described above. Those skilled in the art will recognize this code may be embodied in many equivalent forms and the form below is but one illustrative embodiment. Further, those skilled in the art will recognize the precise machine execution of this code will vary from system to system and may be optimized for various factors.

(R(A,B)=Q) This is a memetic relation in conventional notation. A function R takes two identifiers as inputs and outputs null, false, true, or a real number.

Q: ={null, false, true, real number}.

(R(A,B)=null) Relation is unknown.

(R(A,B)=true) A is known to be related by R to B.

(R(A,B)=false) A is known NOT to be related by R to B.

(R(A,B)=real number) The property R of A is the quantity Q of B units.

(R(A,B)='R(B,A)=Q) Every relation has an inverse relation 'R where the A and B identifiers are swapped.

(R(A,B)=A.R:B) This is memetic notation. It will be more convenient than conventional notation as we proceed.

(B'R: A=Q) Memetic notation for an inverse relation.

(kind (alice,user)=true==alice.kind: user=true==alice.kind: user==alice kind user==user 'kind alice) Example meme stating that Alice is a kind of user. For simple statements, the punctuation is assumed.

(balance (alice,usd)=99==alice.balance:usd=99==alice balance usd 99==usd 'balance alice 99) Example meme with a numeric quantity stating that Alice has a balance of $99.

(Ax.Rx:Bx>Qx & Ax.Ry:By >Qy @cnt?=0) Each expression in the statement has a special function. Certain expressions return sets and forward arrays, where the array is one place value from each set (e.g. every A from the set). In one embodiment, an expression causes data to be read from a lower-speed CRSM and an array of sets and/or an array of values to be written to a higher speed CRSM according to the context in a memetic statement.

(A) If specified, retrieves the set of all memes with this A. If omitted, the starting set is the set of all memes. Forwards an array comprising the As. Only used at the start of a statement. A set of memes all having the same A value is termed an A-set.

(.R) Retrieves the set of all memes with this Rand an A equal to any value from the previous forwarded array. Forwards an array comprising the Bs. The output set may be larger than the input set.

('R) Retrieves the set of all memes with this R and a B equal to any value from the previous forwarded array. Forwards an array comprising the As. The output set may be larger than the input set.

(:B) Filters the previous set to only those memes with this B. Forwards an array of Qs. Only used at the end of a statement. A set of memes all having the same B value is termed a B-set.

(?=, >, <, >=, <=,!=) Quantity operators filter the previous set to only those memes with satisfying Qs.

(+,–, *,/) Arithmetic operators receive the array of Qs by default.

(+=,–=, *=,/=) Arithmetic-update operators receive the array of Qs by default and update the Q value in the respective meme.

(&) The conjunction set operator merges two sets into one set where every A appears in both sets. Memes with As in only one set are excluded. It is optionally processed in parallel on a computing device.

(|) The disjunction set operator merges all memes from two sets into one set. The (;) semicolon defaults to (|) behavior in appropriate cases. It is optionally processed in parallel on a computing device.

(~) The non-conjunction operator merges two sets into one set where every A appears in only one set, but not both.

It is effectively both XOR and NAND. It is optionally processed in parallel on a computing device.

(@cnt) The counter operator counts the number of memes in the previous set. The counter operator may be paired with a quantity operator such as (@cnt?=0), which emits an error if it evaluates to false. Likewise, @min, @max, @avg, @sum, @prod perform their respective aggregate functions.

((A.Rx | A.Ry)==A.Rx,Ry) A disjunction of two relations on one A returns a set with both relations and is equivalent to SELECT Rx, Ry in SQL. This sequence is simplified to a comma for brevity. It is optionally processed in parallel on a computing device.

(alice.parent.brother: bob=true) Rs may be chained. Here, Alice has some unnamed parent who has a brother Bob.

(bob. 'brother. 'parent: alice=true) or (bob'brother 'parent: alice=true) Inverted Rs chain A-A or B-B or A-B. The dot is assumed before an apostrophe.

(.uncle==. parent.brother) A relation may be defined as a chain of other relations.

('uncle=='brother'parent) The inverse of a chain is the relations inversed and reversed.

(.brother==(.sibling & B.gender: male)) A relation between A and B may imply a tangential relation to a C. Here,.brother implies that the B is male. B is underlined to signify the literal letter B is used in the definition.

('brother==('sibling & male 'gender: A)==(.sibling & A.gender: male)==(.sibling &. gender: male)) When A or B is used in the definition, the inverse is further "abversed" to swap the defined A and B. Typically, 4 is omittable from the definition.

(.speed: mps==. distance: m/.time: s) A relation may be defined as a mathematical operation between other relations. Here, for A where A.distance: m is a number and A.time: s is a number, create a new meme A.speed: mps equal to the quotient of the numbers of other two memes.

(camera'kind.price *=0.8) Here, all camera price quantities in all units are reduced by 20%.

(alice kind user; alice balance usd 99; user 'kind.balance: usd<0 @cnt?=0) Here, a user's balance cannot fall below zero.

(.kind:camera &!. kind:phone & (.price:usd<1000 |.resolution:megapixels >20)) Here, the query finds a set where each meme belongs to a camera, or a phone, but not an item that is both camera and phone, that is priced less than $1000 or has more than 20 megapixel resolution. For each satisfying A, the output set includes the A.kind, A.price:usd, and A.resolution memes.

(Af==(Af.Rx:Bx=Qx & Af.Ry:By=Qy & . . . )) An identifier is defined as the conjunction of all relations.

((Ag<=Af)==(Ag.Rx:Bx=Qx & Ag.Ry:By=Qy & . . . )) The analog operator that applies the relations from the statement on the right to the statement on the left. Here Ag receives all of Af's relations.

((Ag=!Q<=Af)==(Ag.Rx:Bx=! Qx & Ag.Ry:By=! Qy & . . . )) Here, the (!Q) on the right applies "not" to all Q's in Af's relations, making Ag is the opposite of Af.

(Ag:Bg<=Af:Bf) Here, all relations between Af and Bf are applied between Ag and Bg.

(.hypotenuse: num==(.xcoord:num^2+.ycoord:num^2) ^0.5; alice.xcoord:num=5; alice.ycoord:num=10; bob.xcoord:num=17; bob.ycoord:num=120; ((distance <=alice)-=bob).hypotenuse) Here, an example of a relation calculating the distance between two objects.

($hypotenuse==(.first: A &.second:B &.length:num=(A.xcoord-B.xcoord) ^2+ (A.ycoord–B.ycoord)^2)^0.5); (alice| bob) Shypotenuse; alice$hypotenuse: bob)) The matrix operator takes a set of disjunctive A-sets and performs the described relations on each permutation. The resulting new temporary memes are given A identifiers distinguishing them as temporary; for example, permanent identifiers are positive and temporary identifiers are negative. If the program instructs the device to permanently store the temporary memes, then the temporary identifiers are swapped for permanent identifiers. Here, an example of a process calculating the distance between each A-set in the disjunctive A-sets of Alice and Bob.

(A::B) Does a search for all relations between A and B. Optionally, depth is limited. Optionally, performs depth first search, breadth first search, variant, or combination thereof.

(bob.human.bob=true) Relations are optionally reflexive. Reflexive relations are inherently symmetrical. This reads, "Bob is a human."

(A.is:B=A.B @cnt >0) The existential relation is true/false if A has any B relation. Note that the B transposes to the R position on the right.

Figure 17:
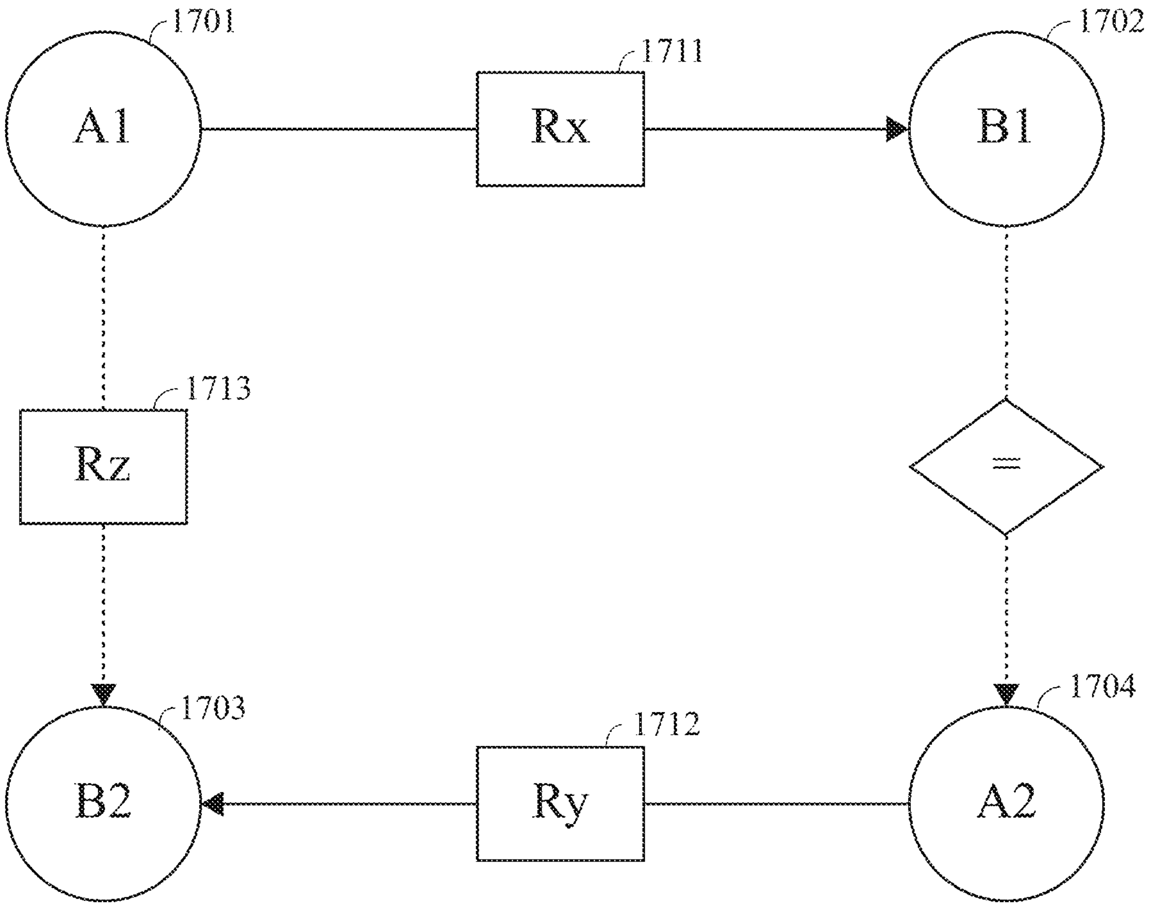
FIG. 17 illustrates a logic box.

FIG. 17 illustrates a logic box. The logic box sequence comprises three R values: Rx 1711, Ry 1712, and Rz 1713. The data set comprises A1 1701 related by Rx 1711 to B1 1702; and A2 1703 related by Ry 1712 to B2 1704. The B1 1702 and A2 1704 have the same identifier value (B1=A2), representing the same idea. The logic box sequence finds a first set of memes related by Rx 1711, wherein a first meme in the first set comprises A1 1701, Rx 1711, and B1 1702. The logic box sequence then finds a second set of memes with an unknown B related by Ry 1712 to A2 1704, wherein B1=A2. The logic box sequence then creates a third set of memes, with one meme comprising A1 1701 related by Rz 1713 to B2 1703. Optionally, any of the A and B values are inverted by using an inverted R value ('R). In one embodiment, this is transcribed as {[. Rx.][B]Ry.][A]Rz B2]} or in shorthand {Rx Ry Rz}.

Figure 18:
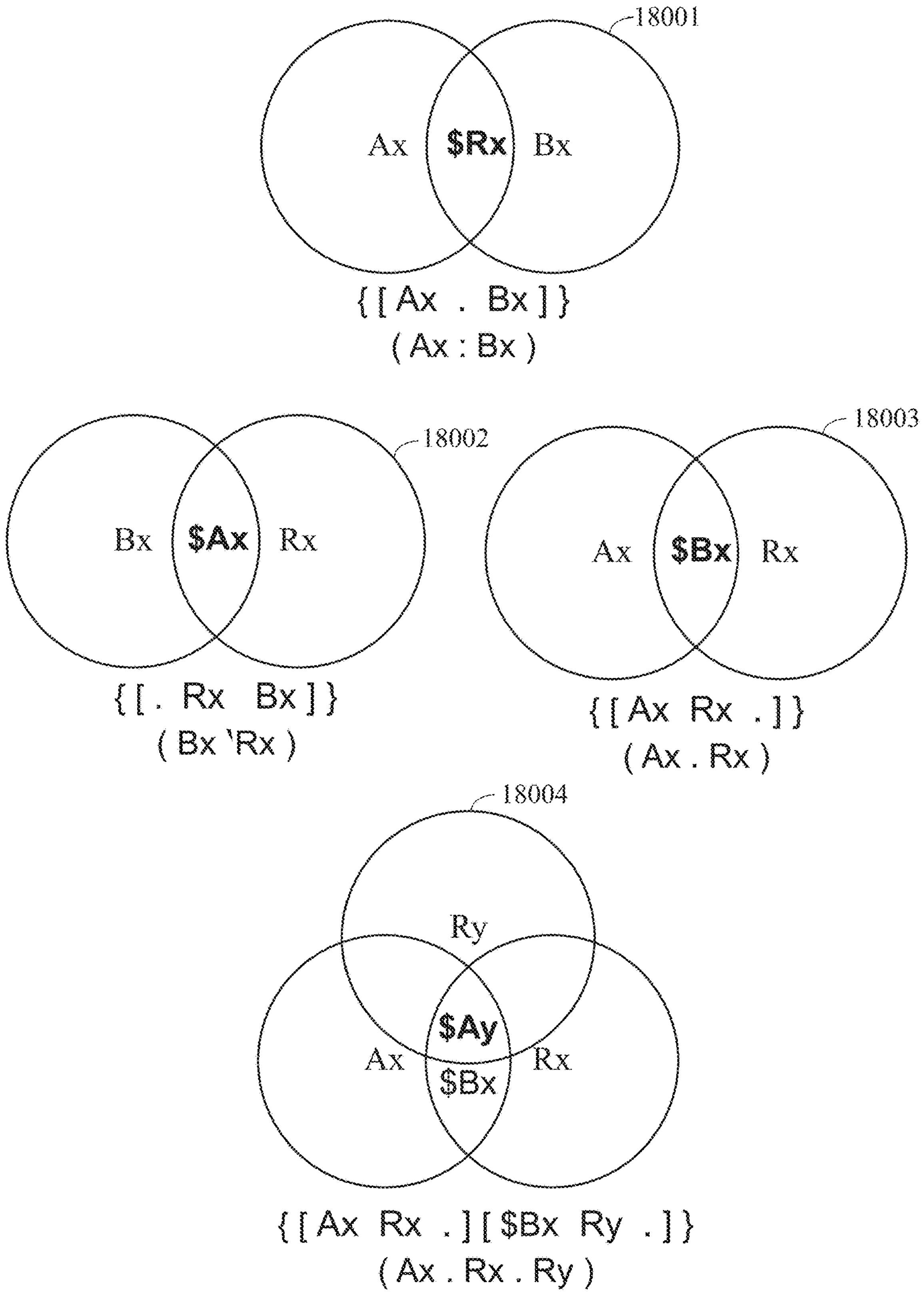
FIG. 18 illustrates queries in terms of sets of As, Rs, and Bs.

FIG. 18 illustrates queries in terms of sets of As, Rs, and Bs. Each query returns a set of memes, the figure illustrates the unknown place value which the query produces. At block 18001, a query with known A=Ax and B=Bx values produces a set with unknown R=$Rx values. At block 18002, a query with known B=Bx and R=Rx values produces a set with unknown A=$Ax values. At block 18003, a query with known A=Ax and R=Rx values produces a set with unknown B=Bx values. Queries are optionally chained as shown in block 18004, wherein a first query with a known A=Ax and R=Rx value produces unknown B=Bx values and those now-known Bx values are paired with a known R=Ry value to find a set with unknown A=$Ay values.

Figure 19A:
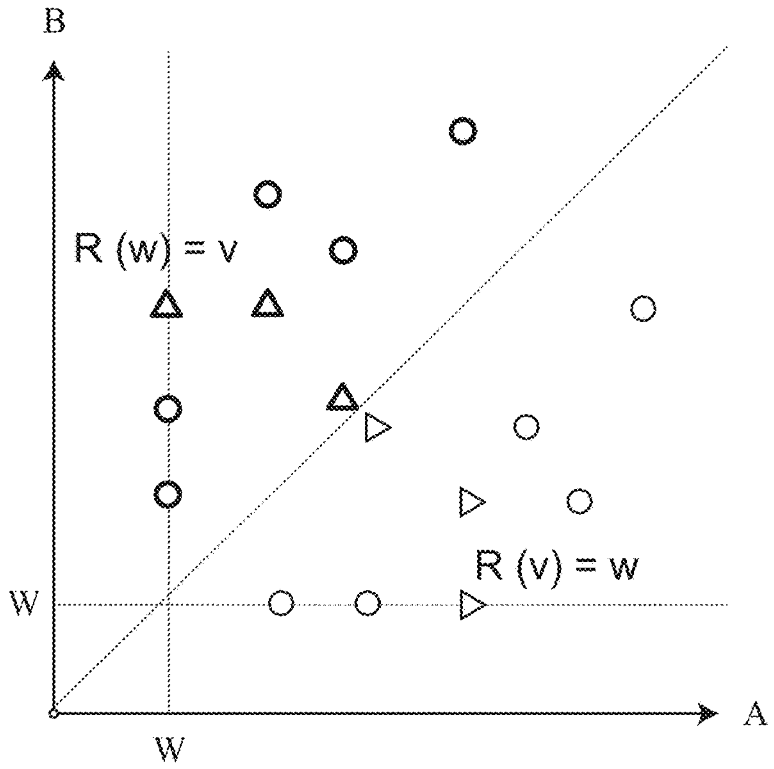
FIG. 19A illustrates ARB relationships on a Cartesian plane.

FIG. 19A Illustrates an ARB scheme on a Cartesian plane. The vertical axis represents the B identifier, the horizontal axis represents the A identifier. A first relation function R(A)=B is plotted with circles. A second relationship function Rt (A)=B is plotted with triangles. Bold shapes represent the original relationship, thin shapes represent inverse relationships 'R(A)=B and 'Rt (A)=B. The graph is semi-symmetric across the line A=B due to the inverse relations. A horizontal line for B=w and a vertical line for A=w is shown. All dots on a vertical or horizontal line share a logical relationship as they all relate to the same identifier. The relation functions are discontinuous. Here, each coordinate output for a relation function is termed a node.

In one embodiment, ARB data is stored on a CRSM in an (A,B) coordinate system where the cell at a given coordinate stores one or more R identifiers for the ARB relationship.

Figure 19B:
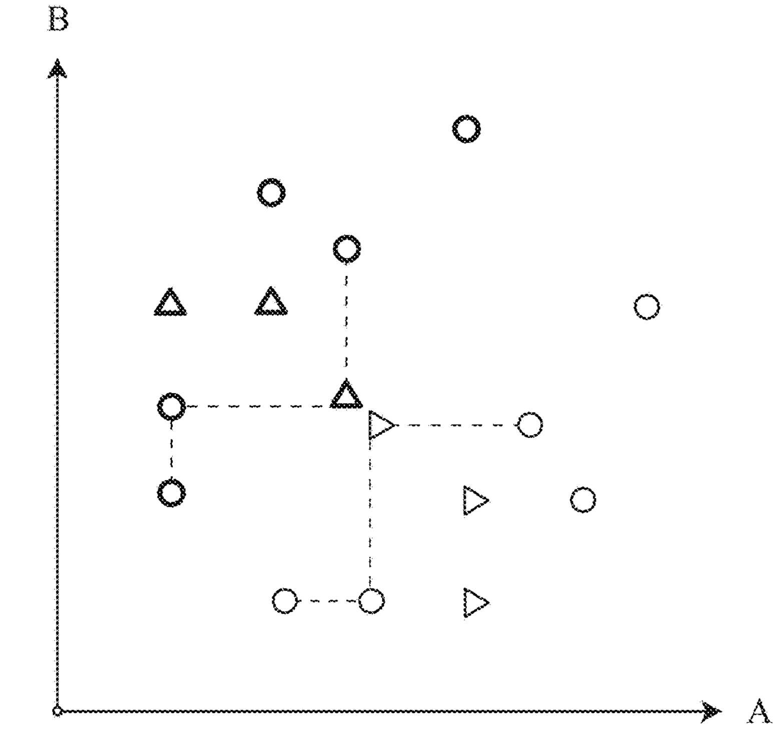
FIG. 19B illustrates ARB relationships on a Cartesian plane.

FIG. 19B Illustrates a logical sequence on an ARB scheme on a Cartesian plane. A logical sequence follows horizontal and vertical lines between nodes. Here, these lines are termed edges. In this example, the same logical sequence is drawn twice, once for the primary relationships and once for the inverse relationships. An efficient logical sequence alternates between horizontal and vertical movements. Two horizontal or two vertical edges in succession does not reveal new information.

A logical sequence may have a pseudo-diagonal edge by inverting a relationship. Such an inversion could be depicted with only vertical/horizontal edges and inverting the relationship does not change any logic or knowledge. However, in certain embodiments, it is useful to use an inverted relationship in storing sequences or retrieving data from a CRSM. A pseudo-diagonal edge that starts at (a,b) will end at either (b,x) or (x,a), where x may equal a or b, such that the ending coordinate shares at least one value from the starting coordinate on the opposing axis.

In the example graph shown, circles represent siblings and triangles represent parents. The edge traces an aunt/uncle relationship which can be verbalized as "my sibling's parent's sibling is my aunt/uncle."

FIG. 20 illustrates an alternate logic notation. In this notation, the R relation is divided into two types: C for conditional relations and D for declarative relations. Typically, Rs in previous figures are declarative. The previous Q quantity has been renamed W and has a conditional V counterpart. This notation traverses a knowledge graph using three novel operators: Condition [, Inversion-, and Declaration]; in addition to standard math operators such as: =,!=, <=, >=, >, and <. Collectively, conditions and declarations are called relations and serve as edges between A and B nodes on a graph. The basic syntax states that some thing A has some declared relation D to some other thing B:

A]D]B=W

For example, "Alice's uncle is Bob," where A=Alice and D=uncle, B=Bob, and W=t (true). This relation is encoded thusly:

Alice]uncle]Bob=t

The W value may indicate true/false or a quantity. Whenever the value is a quantity, the B must be a unit of that quantity. For example, "Alice's height is 1.6 meters" is encoded:

Alice]height]meter=1.6

Relations may be chained. For example, we know that an uncle is a parent's brother:

Alice]parent]brother]Bob=t

Logically, for any declared relation, there exists an inverse relation as well. The inverse relation is indicated by a minus sign:

A]D]B=B]−D]A

For the example above, Bob's "inverse uncle" is Alice. In English, inverse uncle could be "niece" or "nephew."

Alice]uncle]Bob=Bob]−uncle]Alice

Inverse relation chains are inverted and reversed:

Alice]parent]brother]Bob=Bob]−brother]−parent]
Alice

An incomplete declaration is interpreted as a search query where the missing field is a wildcard:

A is wildcard, returns everyone who has Bob as an uncle:

]uncle]Bob

B is wildcard, returns everyone who is Alice's uncle:

Alice]uncle]

D is wildcard, returns all declared relations between Alice and Bob:

Alice]]Bob

Both Bs are chained wildcards, returns all grandchildren of Cindy:

Cindy]child]child]

In one embodiment, an empty=W is interpreted as the semi-wildcard!=f which returns any value except false.

To search for A values matching two declarations, the space character is used as an AND operator. This query searches for people whose uncle is Bob and whose mother is Cindy:

]uncle]Bob]mother]Cindy

To search for A values that match at least one of multiple declarations, the special=tn (where n is a whole number) value serves as an OR operator. All statements with the same n value are grouped into an OR clause. The query below searches for people whose uncle is Bob and whose mother is Dana or Cindy:

]uncle]Bob]mother]Dana=t1]mother]Cindy=t1

The Condition/operator encodes logic as "if" or "when." The Declaration/operator can be considered "then." For example, the relation chain of "if A uncle is B, then A's parent's brother is B" is encoded:

[uncle]parent]brother]

The left side may also encode a quantitative value. For example, "if a person is at least 1 meter tall, then they may ride the rollercoaster" is encoded:

1.0<=meter[height]rideRollercoaster]allow=t

A condition may suggest a relation. For example, any kind of product should have a price in USD greater than or equal to one cent.

product [kind]price]usd >=0.01

In one embodiment, this notation is stored in an SQL relational database such as MySQL™ or PostgreSQL. In one scheme, the database stores both declarative memes and conditional-logic memes in the same table:

CREATE TABLE meme
V DECIMAL/*floating point number like 1.1*/VE
VARCHAR,/*equality operator like < >=*/
A VARCHAR,/*A node */C
VARCHAR,/*Condition
/D
VARCHAR,/*Declaration*
B VARCHAR,/*B node */WE
VARCHAR,/*equality operator like <=!=*/
W DECIMAL/*floating point number like −2.7*/);

Each row is interpreted to produce a meme in the form:

V=A[C]D]B=W

To store an unconditional statement, the special C=is used. This relation is reflexive such that:

A [is]D]B=A[−is]D]B=A]D]B

So the simple statement Alice]uncle]Bob is be expanded to have the row values V=1 (true) VE="=" A=Alice C=is D=uncle B=Bob WE="=" W=1 (true), which produces:

t=Alice[is]uncle]Bob=t

Any other C value produces a conditional statement. For example, the row values V=1 VE="=" A=product C=kind D=price B=usd WE=">=" W=0.01 form:

t=product[kind]price]usd >=0.01

In one embodiment, when parsing this notation, a program stores two arrays on a CRSM. The first operator array represents the condition, declaration, equality, numeric, delimiter, and related operators. The second operand array represents co-indexed identifiers for the specific condition relation, declaration relation, equality relation (e.g. =, >=, <), floating point number, or other operand associated with the operator.

In one embodiment, the two operators and operands arrays are interlaced into one array in the order of operator1, operand1, operator 2, operand2, and so forth.

In one embodiment, the operator array and operand array elements are converted to binary numbers, padded with zeroes to a certain bit length, then written to a CRSM. Optionally, a smaller set of operators allows a shorter bit length for each operator, for example, each operator is given 8 bits while each operand is given 32 bits. Optionally, the binary operators and operands are interlaced on a CRSM such that, using the prior example, each pair occupies 40 bits.

In one embodiment, statements are preceded/followed by a delimiter operator such as a semicolon, (;). The operand co-indexed with the delimiter operator is a floating point or integer value equal to the number of operators in the preceding/following statement.

In one embodiment, all data from the operand array is compressed into the delimiter operand such that only the operand array is necessary. The delimiter operand is a numeric value which can be unpacked into an array of operators. For example, a CRSM contains a mapping of 1234 to t=[ ]>=5, whereby the operands following a delimiter operand of 1234 are each sequentially associated with each of those operators. Or, for example, the delimiter operand is a binary number that is chunked into X bits, each chunk representing an operator.

FIG. 21 illustrates an alternate key-value-like logic notation. Here M is used similarly to B in certain prior notations, where Mis an identifier with no external semantic meaning. Those skilled in the art will recognize that various punctuations are arbitrary and the disclosed punctuations are one illustrative example.

A meme is analogous to a relational database row. A meme comprises key-value pairs, separated by spaces, starting with an arbitrary integer M-identifier, and ending with a semicolon: m=123 R1=A1 R2=A2;. R-relations are alphanumeric keys analogous to relational database columns. A-values are integers, decimals, or strings analogous to relational database cell values. A-value strings containing [^A-Za-z0-9]characters are double-quoted="John\" Jack\" Kennedy ". Comments are prefixed with double forward slashes//.

//Example memes for the Star Wars cast m=123 actor=" Mark Hamill" role="Luke Skywalker" movie="Star Wars" rating=4.5;

m=456 actor="Harrison Ford" role="Han Solo" movie="Star Wars" rating=4.6;

m=789 actor="Carrie Fisher" role=Leia movie="Star Wars" rating=4.2;

Search queries are partially specified statements. Empty parts of the statement are wildcards. Empty A-value queries the specified R-relation for any A-value. Empty R-relation queries the specified A-value for any R-relation. Empty R-relation and A-value (=) queries for all pairs in the meme.

//Example query for all movies with Mark Hamill as an actor actor="Mark Hamill" movie=;

//Example query for all relations involving Mark Hamill

="Mark Hamill";

//Example query for all relations and values from all memes relating to Mark Hamill:

="Mark Hamill"=;

String A-values use=and!=operators. Numeric A-values use standard comparison operators=>, >=, <<=, and!=. For example: firstName=Joe lastName!="David-Smith" height>=1.6 width<2 weight!=150;

R-relations may be prefixed with! for "relation must not equal."

//Example query for Mark Hamill's non-acting relations!actor="Mark Hamill";

//Which is distinct from an actor who is not Mark Hamill actor!="Mark Hamill";

Analogous to relational database joins, using R1/R2 allows for queries matching multiple memes where the A-value for R1 equals the A-value for R2. Open brackets do not need to be closed.

//Generic Example

R1=A1 R2[R3 R4>A4 A5=;

//Example query for all of Mark Hamill's costars actor="Mark Hamill" movie [movie actor=;

//Example query for all movies in which both Mark Hamill and Carrie Fisher act together actor="Mark Hamill" movie [movie actor="Carrie Fisher";

//Example query for anyone who is both an actor and a producer actor [producer;

//Example query for a second cousin: child's parent's cousin's child child=parent [cousin parent [child;

//Join any A-Value from the current meme to that A-Value in any another meme R1=A1[R2=A2

Joined queries return one meme with multiple m=M-identifiers. Each R=A belongs to the preceding m=meme. For example: m=123 actor="Mark Hamill" movie="Star Wars" m=456 movie="Star Wars" actor="Harrison Ford";

R-relations or A-values may be certain variable symbols. Variables cannot be wrapped in quotes. @ Last matching A-value. % Last matching R-relation. #Current M-identifier. Examples: I/Join two different memes where R1 and R2 have the same A-value (equivalent to R1[R2) R1=m!=#R2=@;

//Two different R-relations have the same A-value R1=R2=@;//

The first A-value is the second R-relation R1=@=A2;

//The first R-relation equals the second A-value=A1 R2=%;

//The pattern is run twice (redundant) R1=A1%=@;

More complex joins are made by specifying m and using the #variable.

m=#is implicit in every R=A pair, which are assumed to belong to the current M-identifier m!=#joins to any other meme, excluding the current one m=joins to any meme, including the current one m=^#(shorthand]) sets m and #to the previous M-identifier, used to unjoin and branch queries.

//Join two different memes where R1 and R2 have the same A-value (equivalent to R1 [R2) R1=m!=#R2=@;

//Join any memes (including the current one) where R1 and R2 have the same A-value R1=m=R2=@;

//Join two different memes, unjoin, join a third meme (two equivalent statements) R1[R2]R3 [R4;

R1=m!=#R2=@m=^#R3=m!=#R4=@;

//Unjoins may be sequential

R1 [R2 R3 [R4]]R5=;

R1=m!=#R2=@R3=m!=#R4=@m=^#m=^#R5=;

//Join two different memes on R1=R2, unjoin, then join the first meme to another where R4=R5 R1=m!=#R2=@R3=m=ˆ#R4=m!=#R5=@;

//Query for a meta-meme. R2's A-value is RI's M-identifier

R1=Alm=R2=#

In one embodiment, memes are stored in a SQL database using a table such as:

```
CREATE TABLE IF NOT EXISTS meme (r TEXT, alp TEXT, amt DOUBLE PRECISION, m BIGINT);
CREATE INDEX IF NOT EXISTS meme_m_idx ON meme (m);
CREATE INDEX IF NOT EXISTS meme_amt_idx ON meme (amt) WHERE amt IS NOT NULL;
CREATE INDEX IF NOT EXISTS meme_r_idx ON meme USING HASH ((LOWER(r)));
CREATE INDEX IF NOT EXISTS meme_alp_idx ON meme USING HASH ((LOWER(alp)))
WHERE alp IS NOT NULL;
```

Figure 22:
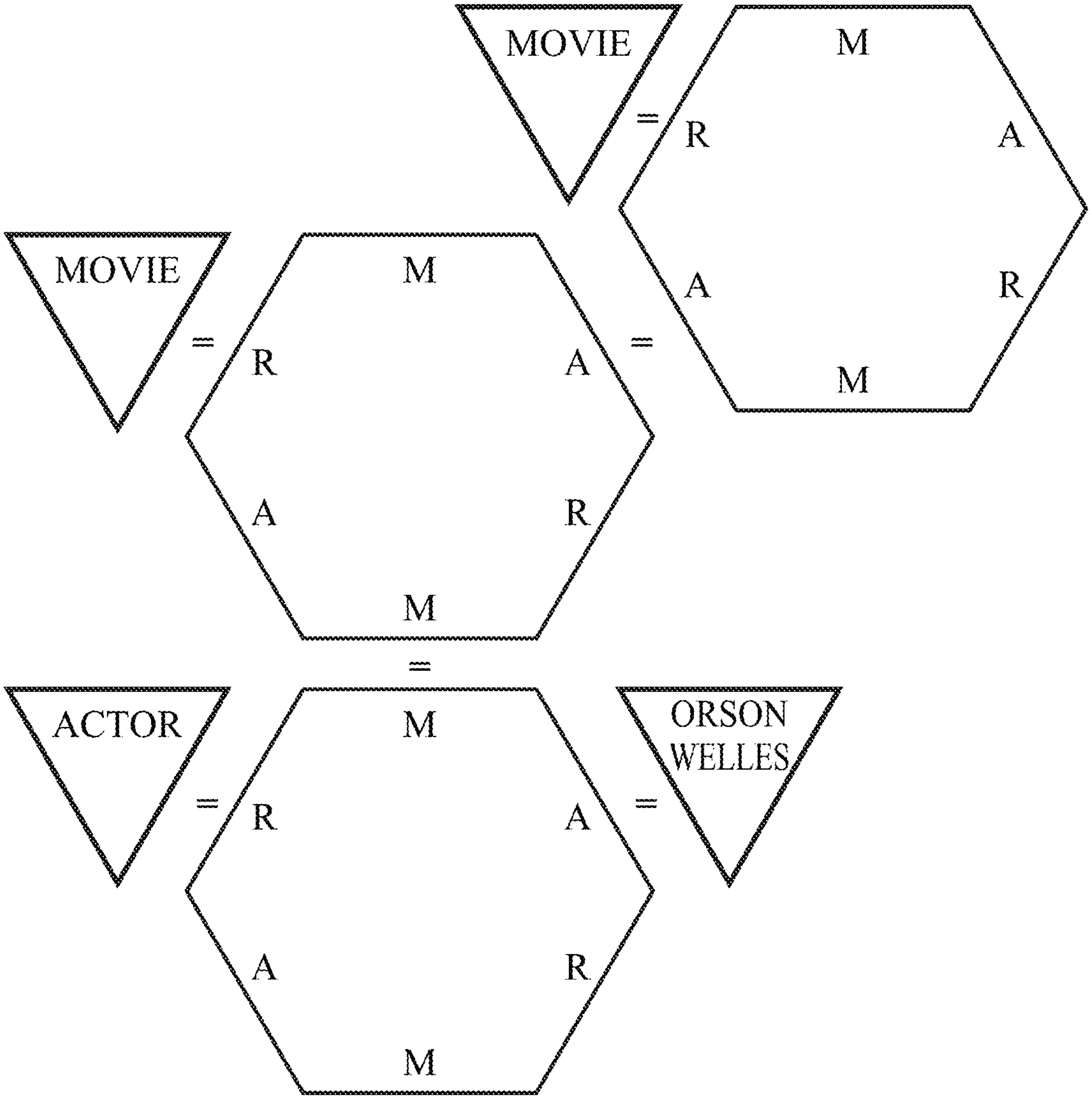
FIG. 22 illustrates a hexagonal visualization of ARM logic notation.

FIG. 22 is a visualization of the prior notation using a vertical stack of regular hexagons arranged bottom-to-top. Each hexagon exposes three inbound edges along its lower half for the M-identifier, R-relation, and A-value; and three outbound edges along its upper half for the same fields, establishing an upward flow of data through the stack. A hexagon represents an R=A binding with either an implicit m=#join or explicit m=x join.

At least one outbound edge of any given hexagon is coupled to at least one inbound edge of the next higher hexagon. Adjacent hexagons may be joined on equality of tokens in any pairing of fields, including R=A, M=R, or A=M, thereby allowing flexible propagation and transformation of identifiers, relations, and values as the sequence ascends. The bottom hexagon, lacking inbound edges, originates the stack, while the top hexagon, lacking outbound edges, terminates it.

Literal constants are denoted by triangular glyphs affixed to the relevant edge of a hexagon. A triangle on a lower edge designates an inbound literal; a triangle on an upper edge designates an outbound literal. In the illustrated example, triangles labeled MOVIE supply literal relation names to lower hexagons, and a triangle labeled ORSON WELLES fixes the A-value emitted by the top hexagon, enabling immediate visual distinction between constants and propagated tokens.

The space between adjacent edges contains the joining comparison operator such as =,!=, >,<, >=, and <=.

FIG. 23 illustrates an alternate variable system for FIG. 21.

A first novel feature is a bidirectional variable scheme that stores every encountered key list and value list in ordered arrays. The forward index p is the one-based ordinal of the pair in strict left-to-right order. The sigil #p retrieves the A list from an absolute forward position, and the double sigil ##p retrieves the Rs list from that same absolute position; thus #1 references the A list of the first pair, #2 the second pair, and so on. The backward index q counts pairs in reverse from the current pair where q=p2-p1. The symbol @ retrieves the A list from a relative backward position, while the doubled symbol @@ retrieves the R list from that same relative position; thus @l references the immediately preceding pair, @2 the pair before that, and so forth. When a query pair contains exactly one explicit key, the present invention lower-cases that key into a dictionary handle, permitting later pairs to access its captured values with expressions such as #actor: p or @birthyear: q. This mechanism replaces the prior scheme of FIG. 21, which exposed only three single-symbol variables and offered no numeric indexing.

In one embodiment, each meme's ARB triplet stored on a long-term CRSM (such as an SSD). A processor reads a first query term (e.g. "movie=*") and copies matching triplets from the long-term CRSM to appropriate arrays in a transient working buffer computer-readable storage medium (such as memory) array. The index position assigned to each newly appended entry defines the forward index p, and by counting backward from the current pair the engine derives the backward index q. Variable operators #, ##, @, and @@ then reference these arrays in evaluating subsequent query terms. The processor reads a second query term ("movie=@2"), determines the @2 references the A value two pairs backward, reads that value from the short-term CRSM and reads matching triplets from the long-term CRSM. When the query concludes the transient arrays are discarded, leaving the persisted memes unmodified.

A second novel feature introduces comma-delimited lists on both the key side and the value side of a pair, thereby collapsing what formerly required multiple pairs into one while preserving inclusive OR semantics.

A third novel feature removes the join brackets of FIG. 21 and replaces them with a sugar -> which is shorthand for m!=@m, which counts as one pair. This keeps the ordered variable arrays coherent.

FIG. 24 illustrates an axial grammar and syntax. An "axial grammar" is a one-dimensional token grammar that encodes multi-dimensional structure through token order and the placement of separator tokens. The input is treated as a linear sequence of tokens. Designated separator tokens advance axis-rank indices so that each non-separator token is assigned a well-defined coordinate in an abstract lattice. Certain axis ranks and index values are assigned semantic roles, without requiring nested delimiters, keywords, or multi-dimensional surface notation. Tokens associated with one coordinate easily reference values associated with other coordinates.

In one embodiment, the parser maintains an n-dimensional integer lattice. Each dimension is called an axis rank, denoted as Axis: rank where rank is an integer from 0 to n-1. For each axis rank, the parser maintains an integer index value, denoted as Axis: rank: index. The axis rank indices collectively form a coordinate tuple ordered from highest-to lowest-rank, left to right, as (Axis: (n-1), . . . , Axis: 0). Each axis rank is associated with at least one separator token type. Upon encountering a separator token, the index on the corresponding axis rank is adjusted (optionally incremented) and each lower-rank axis index is reset to an integer value (optionally zero). Parsed tokens are associated with the resulting coordinate tuples to determine their position in the lattice.

Each axis rank is associated with a combination function according to the particular embodiment. The combination function may be simple, such as logical conjunction (AND), disjunction (OR), or concatenation; or may be more complex, such as constructing a database JOIN operation based on the tokens associated with that axis rank. Depending on the combination function, indices may be treated as enumerative with sequential combination, partitive as levels in a hierarchy, or associative with defined semantic roles.

In one embodiment, certain tokens are designated as relative tokens. A relative token is associated with a coordinate determined by its position in the token stream, while also referencing one or more values associated with a different coordinate. The function that determines the relative coordinate offset between the token's own coordinate and the referenced coordinate is embodiment-dependent. The referenced value may be an expression from the input stream that is currently associated with the referenced coordinate, or an expression obtained by performing a datastore evaluation using the referenced coordinate.

In one embodiment, variable tokens bind at parse time to specific coordinates at their first occurrence. Subsequent occurrences reference values associated with those coordinates, optionally produced later during datastore evaluation. Each variable therefore denotes a stable coordinate tuple rather than a late-bound placeholder that must be resolved against dynamic scope or schema. This early (compile-time) binding can reduce or eliminate the need for correlated subqueries, extensive aliasing in self-joins, and SPARQL OPTIONAL graph patterns, and it enables deterministic substitution and plan construction prior to execution.

In one embodiment, expressions are carried forward, such that for each populated ( . . . , x, y), the associated expression is duplicated to populate ( . . . , x+1, y) when that coordinate is otherwise empty. This carry-forward behavior expresses a broad context-such as a table or column —once and reuses it implicitly in subsequent coordinates that do not override it, reducing redundancy in the written expression. Optionally, this carrying forward is partially executed by padding a relative token into omitted coordinates.

The axial grammar may be embodied in various forms. Optionally, a separator token is ignored when sequential with another separator token. Optionally, the coordinate tuple is denoted lowest-to highest-rank left to right. Optionally, upon encountering the associated separator token, the axis rank index is decremented. Optionally, axes or indices are one-indexed or zero-indexed.

The depicted figure embodies the axial grammar as a database query language corresponding to SQL semantics of table, row, column, and value. The embodiment is exemplary and may be extended, rearranged, or renamed for n axis ranks with i indices for each without departing from the grammar. As used herein, the term "axial grammar" is employed in place of the term "positional grammar" used in earlier related filings, in order to more clearly differentiate the disclosed syntax from prior and contemporaneous notions of positional grammars that are similar but not identical. As used herein, the term "axis" is applied across all axis ranks, where earlier related filings sometimes used the term "axis" to refer only to Axis: 0 without explicitly stating rank of zero.

The depicted embodiment forms a forms a Matrix->Vector->Limit axis hierarchy. Axis: 2 is named Matrix, associated with a double semicolon (;;) separator token, indices increment left to right, and indices are enumeratively combined through logical disjunction. Axis: 1 is named Vector, associated with a single semicolon (;) separator token, indices increment left to right, and indices are enumeratively combined as logical conjunction (either by AND or JOIN in the database query). Axis: 0 is named Limit, associated with a space (" ") separator token, indices decrement left to right (3, 2, 1, 0), and indices are associatively combined as semantic roles corresponding to SQL conventions.

The depicted descending Axis: 0 index arrangement is to align with the programming convention of broad->narrow, such as key->value. Axis: 0:3 corresponds to table identifier, Axis: 0:2 corresponds to row identifier (primary key), Axis: 0:1 corresponds to column identifier, and Axis: 0:0 corresponds to value. The mapping extends to RDF/SPARQL as graph/subject/predicate/object positions without changing semantics. Extended Axis: 0 indices optionally encode certainty, versioning, provenance, temporality, graph modalities, or as-yet-unknown data relationships while remaining within the axial grammar. For each Vector (Axis: 1), Axis: 0 indexing is dynamic such that the leftmost expression has an index of one less than the count of expressions in that vector while the rightmost expression has index 0. Optionally, this dynamic indexing is implemented by prepending each new Axis: 0 expression to an internal array as the parser reads the token stream. Each Vector is thereby populated lowest Axis: 0 index first. Omitted higher Axis: 0 indices are carried forward from the prior vector. Akin to cylindrification, the result is a "rectangular" matrix where all Vectors have the same Limit count.

In one embodiment, no explicit separator token is used for a given axis rank. The lower-rank axis has a fixed index length, and each higher-rank axis index is inferred from the running count of lower-rank separator tokens, by dividing that count by the fixed index length and rounding down to the nearest integer.

In another embodiment, no separator tokens are used. Each expression is encoded as a fixed-length bit field and each axis index is a fixed integer. The absolute index is determined by counting bits from the beginning of the encoding, dividing by the fixed bit length, and rounding down to the nearest integer. The axis rank index is then obtained by dividing this absolute index by the product of the lower-rank fixed axis index lengths and rounding down to the nearest integer.

For matrices that are either input as rectangular or padded to be rectangular, relative plural coordinates are optionally condensed into a single coordinate relative to absolute limit count. For example, the relative coordinates of "same matrix, prior vector, same limit" are optionally condensed into one relative coordinate expressed as "absolute limit count minus fixed axis index integer"; for an Axis: 0 fixed index length of 4, this would condense (0,−1, 0) into (−4).

The depicted syntax reserves specific tokens. An asterisk (*) denotes a wildcard value on any coordinate. An at-sign (@) denotes a VSAME token referring to the same limit index in a previous vector of the same matrix, and a caret (^) denotes an MSAME token referring to the same limit index in the last vector of a previous matrix. A comparison operator token (=,!,!=, >, >=, <, <=) optionally precedes each Limit to control set intersection during evaluation; omitting an operator elides equality. Tokens such as STR (joe), QUOT ("Joe Smith"), INT (5), FLOAT (5.1) represent literals. A comma (,) logically disjoins values in one expression. Certain other characters are conditionally or unconditionally ignored. Each Limit may optionally begin with a variable token, which binds that Limit's (Matrix, Vector, Limit) coordinate tuple to a symbol that later tokens can dereference. While these particular tokens are used in this illustrative syntax embodiment, other distinct tokens may be substituted without departing from the axial grammar.

In the depicted embodiment, the VSAME relative token dereferences to the data stored in the same matrix, previous vector, same limit; or in relative (matrix, vector, limit) terms (0,−1, 0). Conventional self-join syntax is replaced by a vector with VSAME or a variable in Axis: 0:0 and a NOT-VSAME (!@) limit for the row identifier/primary key in Axis: 0:2. Conventional other-table-join syntax is replaced by a vector with VSAME or a variable in Axis: 0:0 and a distinct table name in Axis: 0:3.

In the depicted embodiment, the MSAME relative token dereferences to the data stored in the previous matrix, last vector, same limit; or in relative (matrix, vector, limit) terms (−1, max, 0). Optionally, additional relative tokens point to different sets of relative coordinates. Various embodiments optionally comprise various other tokens representing other relative coordinates.

In the depicted embodiment, a lone operator implies an elided VSAME after; for example, "=" is expanded to "-@" for "equals same limit in previous vector." In some embodiments, specific matrix or vector operators precede those strings.

In various embodiments, the axial grammar combines elements of previous figures. FIGS. 1-3 present ARB memes as ordered A-R-B tuples and tabular rows, and the axial grammar uses this ordered tuple view when mapping each token position to an Axis: 0 index that denotes identifiers and values within its lattice. FIGS. 3 and 4A-4B describe column/row and meta-column schemata in which each column name determines the semantic role of a cell in a fixed-width row, and the axial grammar uses an analogous columnar schema when treating Axis: 0:3, Axis: 0:2, Axis: 0:1, and Axis: 0:0 as table, key, column, and cell indices. FIG. 13 introduces an ARB logic notation with explicit AID, RID, BID, and QNT columns plus comparison and arithmetic operators, and the axial grammar uses the same four-coordinate structure and operator vocabulary when encoding limits that pair values with comparison tokens inside a matrix-vector-limit lattice. FIG. 14 defines a bracket-based query grammar [A R B Q/V]F [ARB Q/V]with wildcards and nested subqueries, and the axial grammar uses analogous positional indices in Axis: 0 with wildcard values, and relative tokens to achieve joins which mimic subqueries. FIG. 15 specifies a sequence calculus over sets of memes in which unnumbered variables inherit values from previous sets and inverse relations appear implicitly, and the axial grammar uses similar relative-coordinate semantics through VSAME and MSAME tokens that dereference prior vectors and matrices while carrying forward omitted indices. FIG. 17 depicts logic boxes {Rx Ry Rz} that join two ARB sets on shared intermediate identifiers to synthesize new relations, and the axial grammar uses multiple vectors within a matrix together with VSAME-like tokens to express analogous join patterns without explicit intermediate names. FIG. 18 models queries as mappings from known A, R, or B arguments to unknown positions and chained query steps, and the axial grammar uses the same notion of axis-wise knowns, unknowns, and chained constraints when interpreting wildcards, plural limit values, and successive limits inside a meme. FIGS. 19A-B present ARB data as points on an (A,B) Cartesian plane with horizontal and vertical edges (and pseudo-diagonal edges via inverse relations), and the axial grammar uses a comparable coordinate viewpoint by parsing expressions into lattice coordinates whose numeric axis indices select tables, keys, columns, and values with explicit support for relative offsets along those axes. FIG. 20 introduces an ACDB notation in which incomplete declarations, condition brackets, and equality operators define path-based graph queries, and the axial grammar uses axis positions, optional comparison operators, and omitted tokens as wildcards to encode similar path-style queries over relational and graph data in a single linear syntax. FIG. 21 specifies a key-value-like logic notation in which statements such as m=123 actor="Mark Hamill" movie="Star Wars" use whitespace and punctuation as separators and join brackets R1 [R2 express equality-based joins across memes, and the axial grammar uses related linear-token and separator conventions when delimiting datums, limits, vectors, and matrices and when expressing joins via coordinate-sharing and relative tokens. FIG. 23 describes a bidirectional variable system with forward (#p, ##p) and backward (@q, @@q) indices over ordered key and value lists stored in transient arrays, and the axial grammar uses conceptually similar coordinate-aware variable and VSAME/MSAME mechanisms that bind symbols to fixed (matrix, vector, limit) coordinates but omit explicit p and q values.

Conventional query languages such as SQL constrain the table name and column name to a single fixed value in each syntactic position, so that operations spanning multiple tables or multiple columns require explicit repetition, unions, or generated code. By contrast, the axial grammar allows non-fixed and plural values on any Limit axis, so that a single expression may range over multiple table names and/or apply a value condition simultaneously to multiple columns. For example, >7*col1, col2 17; searches tables with integer names greater than 7 for rows that have a value of 17 in either col1 or col2. In some embodiments, the grammar admits such generalized axis forms even when a particular execution engine supports only a subset of them; unsupported axis combinations may be statically rejected, rewritten into equivalent supported sub-queries, or dispatched to an alternate engine, while the axial grammar itself remains uniform and closed under composition.

In one embodiment, the axial grammar enables deterministic, single-pass parsing with time linear in the input length. Tokens are recognized by a fixed automaton that classifies characters into operators, literals, and separators with at most trivial look-ahead. Each token's axis index determines its placement in the lattice, so the parser neither backtracks nor rescans; instead, it streams tokens into pre-allocated node arrays while performing constant-time consistency checks. Memory growth is a bounded multiple of the input size, reducing runtime schema discovery, nested clause folding, and heuristic join inference. Throughput is thereby comparable to raw string copying while still producing a fully validated, execution-ready intermediate representation.

In one embodiment, the axial grammar serves simultaneously as the declarative query language and as the canonical representation of the data it produces. Each result set can be re-expressed in the same axial grammar, allowing outputs to flow directly into subsequent expressions without serialization, re-parsing, or schema negotiation. By unifying command and data formats under a deterministic axis mapping, the invention enables recursive analytics, constant-time pipeline composition, and lossless round-tripping of result sets back into axis form, thereby supporting complex analytics pipelines with effectively zero serialization and schema-negotiation overhead.

One aspect of the invention is that the axial grammar unifies relational and graph-style queries under a single coordinate system, eliminates late-binding variables by binding symbols to fixed coordinates, and generates uniformly shaped data structures that serve both as an executable representation and as training data for machine-learning models. This provides deterministic parsing, bidirectional translation between syntax and data, and concrete performance benefits over conventional query languages.

Figure 9:
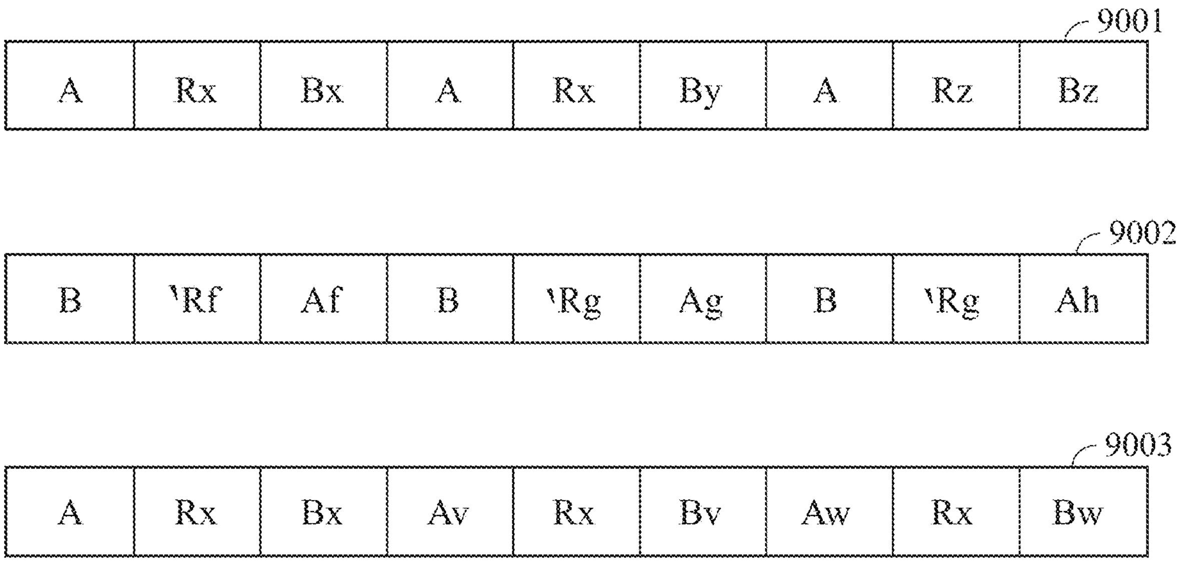

In one embodiment, a compiler for the axial grammar emits a contiguous, 128-byte-aligned device buffer in which each logical row occupies exactly 128 bits (16 bytes) encoded as two 64-bit words. A first word w0 packs, for example, a 32-bit Axis: 0:3 identifier and two 16-bit identifiers for Axis: 0:2 and Axis: 0:1, and a second word w1 stores a little-endian 64-bit Axis: 0:0 literal. The compiler simultaneously produces a device-side offset table that maps host-side expression or sentence indices (or other query references) to byte offsets within the buffer. A host processor allocates pinned memory, aligns the buffer to a 128-byte boundary, and transfers the packed rows and offset table to the GPU asynchronously via a CUDA stream. At execution time, a kernel (e.g., MEME_SCAN) is launched with blockDim=128 and gridDim=ceil (N/4) for N rows, and each thread processes four contiguous rows to maximize coalesced access. For a thread with global index i, the kernel computes base=4.i, performs coalesced loads of w0 and w1 for rows [base . . . base+3]into shared memory, applies an in-register associative reduction (for example, prefix-sum, min/max, or XOR fold) over the four rows without branching, and performs a single global-memory write of the intermediate or final result. This layout presents a struct-of-arrays device view (w0 [ ], w1 [ ]) that avoids pointer chasing and enables predictable address arithmetic. In various embodiments, field widths may be adjusted (e.g., widening Axis: 0:2 and/or Axis: 0:1 identifiers), and the Axis: 0:0 payload may encode numeric or canonicalized non-numeric literals, provided the overall row size remains 128 bits; word and row sizes may vary across embodiments. This generalizes the fixed-width ARB layouts and sharding schemes of FIGS. 9-10, aligning semantic indices with contiguous CRSM and GPU-tensor coordinates.

This organization yields concrete computing benefits: (i) denser rows (16 B vs larger structured layouts) reduce host-to-device traffic and improve cache/L2 utilization; (ii) 128-byte alignment and four-rows-per-thread coalesced access reduce memory transactions and cut store pressure by ~4×(one store per four rows); (iii) shared-memory staging plus register-level reduction minimizes divergence and round-trips to global memory; (iv) pinned, asynchronous transfers enable overlap of movement and compute; and (v) the device-side offset table supports O (1) mapping from host queries to device regions without rebuilding buffers. In representative scan/filter workloads these mechanisms provide a specific improvement in computer functionality over interpreter-style CPU traversals and over declarative engines (e.g., SQL/SPARQL) that rely on pointer-rich row stores and tokenization, delivering materially lower execution time and higher throughput at scale. Aspects include, in combination: (a) a fixed-width 128-bit row packing of four indices into two 64-bit words with defined endianness; (b) a compiler-emitted device offset table keyed to host query elements; (c) a four-rows-per-thread GPU schedule with a single coalesced global store following an in-register reduction; and (d) a struct-of-arrays device representation derived from the packed buffer to eliminate intermediate tokenization and pointer chasing.

In some embodiments, the packed 128-bit row buffer is exposed as one or more contiguous GPU-resident tensors without copying. For example, the compiler presents w0 [ ]and w1 [ ]as stride-1 device arrays of 64-bit elements (unsigned or signed) aligned to 128-byte boundaries, or as a single vectorized 16-byte element type. The mapping is effected via a zero-copy device-memory interoperability interface (e.g., a CUDA array interface or DLPack handle), enabling machine-learning runtimes to consume the lattice directly as tensors. Because the row layout is fixed-width and the engine also emits a device-side offset table, downstream kernels (e.g., feature extractors, reductions, attention-style scorers) can index, batch, and fuse operations over four-row groups per thread without host deserialization or reformatting. This eliminates intermediate tokenization and copy/convert steps, improves end-to-end throughput in training and inference pipelines, and preserves coalesced access patterns established by the MEME SCAN schedule.

In one embodiment, the lattice is expanded to handle vector embeddings. The leftmost Axis: 0 index presents a collection identifier that selects the target vector database; the next index specifies the similarity metric (for example, "cosine" or "dot"); the third index holds a numeric threshold St, establishing the maximum admissible distance (or the minimum required similarity). Following indices, counted downward from N to 1, convey the individual components vn. . . . Vi of the probe embedding, thereby aligning one vector component per syntax axis. Additional indices hold vector metadata such as a string value. During execution the engine computes the metric distance p (u,v) between each stored vector u and the probe v; the returned row comprises the vector table database identifier, p where pst, each embedding value, and the relevant metadata. This axis mapping integrates nearest-neighbor retrieval into the same positional algebra used for relational and graph queries without introducing key-based fields or altering variable semantics.

This axial grammar reduces large language model compute costs by lowering the token length of expressions. In one illustrative example, the expression roles*actor "Orson Welles"; movie *;! @ @ @; actor *, which essentially asks "Who has costarred in movies with Orson Welles?", comprises 19 tokens according to OpenAI's tokenizer for GPT-40 models. The SQL equivalent, SELECT t0.actor, t0. movie, t1. movie, t1. actor FROM roles AS t0, roles AS t1 WHERE t0. actor='Orson Welles' AND t1. id!=t0. id AND t1.movie=t0. movie, comprises 48 tokens under the same tokenizer, so the axial grammar reduces token count by approximately 60%. For illustration, assuming costs of $1 per million tokens for 10 billion queries per day, this reduction corresponds to an annual compute-cost savings of about $106 million ((48-19)×1/1,000,000× 10,000,000,000× 365=105,850,000).

The following paragraphs walk through FIG. 24 as one concrete example. The depicted figure is herein interpreted as a single matrix at Axis: 2:0 with coordinates (Axis: 2, Axis: 1, Axis: 0) starting at (0,0,0).

Axis: 1:0 matches roles in which Orson Welles is the actor. (0,0,3) is the table name "roles". (0,0,2) is a wildcard row identifier. (0,0,1) is the column name actor. (0,0,0) is the name "Orson Welles".

Axis:1:1 further retrieves the movie column value with the row identifier matched from the previous vector. (0,1,3) is omitted, carrying forward the table name from (0,0,3). (0,1,2) is omitted, carrying forward the row identifier from (0,0,2). (0,1,1) is the column name "movie". (0,1,0) is a wildcard matching any movie name.

Axis: 1:2 performs the JOIN operation. (0,2,3) is omitted, carrying forward the table name from (0,0,3). (0,2,2) is the NOT operator with VSAME datum, matching a different row identifier than that of (0,1,2). (0,2,1) is VSAME, matching the same column name as (0,1,1) "movie." (0,2,0) is VSAME, matching the same value as (0,1,0) which is the movie's name.

Axis: 1:3 further retrieves the actor name from matching the new row identifier. (0,3,3) is omitted, carrying forward the table name from (0,0,3). (0,3,2) is omitted, carrying forward the new row identifier from (0,2,2). (0,3,1) is the column name "actor". (0,3,0) is a wildcard matching any actor name. Viewed as a whole, Axis: 1:0 through Axis: 1:3 therefore encode a self-join on the roles table that finds co-stars of Orson Welles by matching movies and excluding the original actor.

FIG. 25 illustrates an extended axial grammar and syntax that combines FIG. 24 with additional concepts from prior figures, including explicit domain-definition modes, inline aggregate and ordering functions, variable-binding annotations, and similarity comparators. Annotations in the extended axial grammar provide context for the tokens in a given axis rank index without altering the axis rank or index.

In one embodiment, the extended grammar includes a FUNC annotation allowing aggregation, grouping, and sorting semantics to be expressed directly on a Limit. FUNC is independent of the comparison operator: a single value limit can both compute an aggregate over a group and then compare the aggregate to a threshold or use the aggregate as an ordering key. Generically, aggregation functions (for example, sum, count, minimum, maximum, average, last) collapse multiple rows into a single representative value per group, while grouping functions mark which values define the group. Sorting functions designate the order in which groups or rows should be returned. In contrast to conventional query languages that express aggregation, grouping, and ordering in separate clauses (for example, SQL's GROUP BY and ORDER BY) that must be reconstructed from a tree of nested expressions, the FUNC annotation keeps aggregate semantics attached directly to the value limit at its axis coordinate. This organization allows the interpreter to derive a grouped execution plan in a single streaming pass over the matrix without performing a secondary traversal to discover grouping keys, thereby reducing plan-construction overhead and avoiding a class of errors in which an author or language model specifies inconsistent aggregate and grouping clauses.

In one embodiment, the extended grammar includes a MODE annotation that switches between Vector domains such as schema definition, data querying, and query metadata, remapping the Limit indices to semantic roles. The MODE token itself is not indexed as a Limit. Optionally, a given MODE persists across Vectors until a new MODE is declared.

In one embodiment, Matrices and higher-rank axes are decorated with annotations.

The depicted embodiment reduces Axis: 0 index count from four to three. Axis: 0:2 corresponds to table, Axis: 0:1 corresponds to column, and Axis: 0:0 corresponds to value. The prior row identifier or primary key is manipulated as an ordinary column on the column index rather than as a dedicated index. This reduction preserves the axial grammar of FIG. 24 while simplifying the model.

In the depicted embodiment, the extended axial syntax uses underscore ( ) for wildcard, while asterisk (*) is reserved for multiplication. A Vector of just underscore as;_; or an Axis: 0:1 of underscore projects all columns similar to SQL's SELECT*FROM.

The depicted embodiment teaches a dynamic Vector combining function according to the Axis: 0:2 value. An omitted value signifies additional filtering for matching rows (WHERE AND); while an @, definite value, or indefinite value signifies a database JOIN-even if the limit dereferences to the same value as Axis: 0:2 in the prior vector.

In the depicted embodiment, a functional annotation (FUNC) is attached to an Axis: 0:0 Limit denoting aggregation, grouping, or sorting behavior. FUNC is encoded as one or more colon-prefixed tags appended to the value limit data term. Aggregation functions include: sum,:cnt,:min ,: max,:avg, and:last; a grouping function:grp marks that the associated limit participates in a GROUP BY; and ordering functions: asc and:des indicate ascending or descending sort order, respectively. For example, the query roles rating: avg>=4.2; actor:grp;; attaches:avg to the rating value limit and:grp to the actor limit, expressing "group roles by actor and retain only those actors whose average rating is at least 4.2." The query roles rating:min : asc; actor:grp;; attaches both:min and: asc to the rating limit, expressing "for each actor, compute the minimum role rating and order the actors from lowest minimum rating to highest." The compiler detects the presence of any grouping function within a matrix and automatically treats other value limits as aggregated, defaulting to a "last" aggregate where no explicit aggregate FUNC is specified, thereby ensuring that all selected value limits are compatible with an underlying grouped execution plan. In certain embodiments, the FUNC annotation is extended with window and ranking annotations. A: row tag designates a row-number function. A: rank tag specifies a sparse ranking.

In one embodiment, these FUNCs correspond to the set commands described in FIG. 15 and the aggregate operators described in FIG. 16. The: grp FUNC refines the earlier notion of operating on sets and A-sets in FIG. 15 and the grouped query sets of FIG. 18.

In one embodiment, MODE is encoded as a leading symbol followed by a mode name. A table-definition vector begins with a table-definition mode token such as &tab, followed by the table name on Axis: 0:2, followed by one or more column definitions. Each column definition includes a column name in Axis: 0:1 and a sequence of limits and functions in Axis: 0:0. For example, the declaration % tab roles id: TYP=INT; >0; rating: DESC="Decimal 0-5 star rating of performance ";: TYP=DEC; >0;<=5; actor: DESC="Actor's full name";: TYP=STR; character: DESC="Character's full name ";: TYP=STR;; uses a &tab mode token to introduce a roles table, identifies id, rating, actor, and character as columns, and attaches type and descriptive metadata to each column via functional suffixes such as: TYP and: DESC in Axis: 0:0. A uniqueness vector such as guni roles id;; declares that the id column of roles is unique. A foreign-key vector such as &for actors name;roles actor @;; states that the actors.name column is linked to the roles.actor column; this is expressed in axial form by placing the actors table and name column on one vector, the roles table and actor column on a subsequent vector with the relative token @ in Axis: 0:0 to refer back to the prior value.

In one embodiment, the % tab mode represents schema-level metadata that is analogous to the meta ARB triples described in FIG. 4A. Comparator limits specified for a column in % tab mode are analogous to the value constraints expressed in the conditional notation of FIG. 20. The for mode is analogous to the relationship constraints enforced via kind and meta relations as described in FIG. 8.

In one embodiment, a given axis rank index (such as Axis: 0:2) is constrained to a given data type such as float, integer or string. In one embodiment, for a numerically typed (such as 0-1 float for probability) axis rank index, a function computes an aggregated result value for that axis index over one or more higher-rank axes. Example functions include min, max, median, sum, and product. For example, a 0-1 float probability for Axis: 0:5 in all Axis: 1 indices within Axis: 2:1 index is combined via the product rule for independent probabilities to produce a 0-1 float joint probability for Axis: 2:1, alternatively denoted as product ( . . . , 1, *, 5). In effect, this allows the system to attach numeric confidence values to specific coordinates and then combine those confidences into a joint probability over higher-rank structures such as a particular matrix or query result.

In one embodiment, the interpreter maintains an in-memory schema catalog populated from domain-definition vectors such as % tab, suni, and % for. When a query-mode matrix is parsed, the interpreter performs a static validation pass in which each table limit value is checked for existence in the catalog, each column limit value is checked for membership in the corresponding table definition, and each comparison on the value limit is checked for type compatibility with the declared column type. Violations, including misspelled table names, unknown columns, and incompatible type comparisons (for example, numeric comparison on a string-typed column), are reported at parse time with coordinates, allowing the author or an LLM to correct the query before any execution plan is generated.

In certain embodiments, the uniqueness (% uni) and foreign-key (% for) domain modes are also enforced statically. When the interpreter detects a join pattern that conflicts with a declared uniqueness or foreign-key constraint, the compiler may either reject the query as unsatisfiable, or rewrite it into an equivalent but more efficient form, such as eliding redundant self-joins or converting multi-column equality predicates into a single synthetic key comparison. This behavior yields a specific improvement in query plan quality by exploiting declarative schema metadata that is expressed in the same axial grammar as the query itself.

The extended axial syntax also includes a query mode and one or more meta modes. In query mode, the table-column-value indices are interpreted as data-selection constraints over concrete rows, and the vocabulary admits comparison, similarity, and arithmetic operators. Meta mode holds execution metadata such as a maximum row count, an offset, or a similarity threshold.

In one embodiment, query mode is the default MODE, and meta mode is explicitly introduced with a token such as &m. Within meta mode, the column limit names a configuration key and the value limit supplies a literal value; the compiler binds that value to a synthetic variable in the lattice and to a corresponding execution parameter. For example, a meta vector % m lim 12; binds a configuration key lim to the integer value 12, enabling the compiler to generate a LIMIT 12 clause in an underlying SQL plan while also exposing a variable $1 im inside the axial grammar. A vector % m sim 0.33;; binds a similarity threshold, which can then be reused in a query such as movies description <=>" war ">=$sim; where a similarity comparator <=> is parameterized by the threshold $sim bound in meta mode. Because meta vectors are stored in the same meme lattice as data vectors, they benefit from the same single-pass parsing and deterministic binding. Meta vectors therefore behave like configuration records that share the same coordinates as the data they influence, allowing a single script to interleave query constraints and execution parameters in one axial form.

In one embodiment, this syntax includes similarity comparators SIMOP that extend the set of comparison operators available on the value limit. Instead of limiting comparisons to equality, inequality, and numeric ranges, the notation allows limits to express vector similarity or distance constraints directly. A SIMOP can operate on explicit numeric vectors or on literal strings that are first transformed into embeddings. These operators are treated identically to other comparison operators at the grammar level and participate in the same axis ordering and variable-binding semantics.

In one embodiment, similarity operators are encoded as multi-character punctuation tokens such as"<=> ","<-> ", and "< #>", corresponding respectively to cosine similarity, L2 distance, and inner product, and may be combined with the existing comparison operators to form limits on similarity scores. A value limit of the form description <=> "robot ">0.33; applies a cosine-similarity operator between an embedding of the string "robot" and the stored embedding for the description column, and then constrains results to those rows whose similarity exceeds 0.33. When the right-hand term of a similarity operator is a quoted string or unquoted token, the compiler invokes an embedding function that deterministically converts that token into a numeric vector literal at compile time, so that the execution engine receives only numeric vectors and thresholds. Additional comparators such as ~ and! ~ are provided for pattern-style similarity and dissimilarity checks and are treated as part of the same comparison vocabulary.

This extended grammar also includes a functional variable-binding annotation that allows variables to be introduced on the left side of a limit, in contrast to FIG. 24 where variables were attached directly to the limit. Generically, a variable-binding function VARFUNC tags a coordinate as defining a symbolic binding for the value produced by that coordinate; subsequent limits may then reference that symbol in either value or comparator positions, and the compiler rewrites those references as positional coordinate dereferences.

In one embodiment, variable-binding functions are encoded as a colon followed by a variable token, such as: $a, attached to the value limit that defines the variable. The variable itself, written $a in this embodiment, may then appear wherever a value token is permitted on the right-hand side of any limit in the same matrix. For example, the query roles actor: $a~"Bruce Willis ", "Uma Thurman";movie_; @ @ @;actor! $a;; uses: $a to bind the value of the actor limit to a variable $a while restricting that limit to actors whose names are similar to "Bruce Willis" or "Uma Thurman." A later limit actor! $a then uses the same variable to exclude those bound actors from the co-star list, effectively expressing "return co-stars seen with Bruce Willis and Uma Thurman but not the named actors themselves." Because variables are bound at parse time to specific coordinates, these: $var bindings preserve the coordinate-aware semantics of FIG. 24 while allowing functional annotations and similarities to share the same compact syntax.

This extended grammar leverages modes and functional annotations together to express complex analytic queries and execution controls in a linear, LLM-friendly script. Domain-definition modes (for example, % tab, % uni, % for) declare tables, primary keys, and relationships using the same Axis: 0 three-index grammar that drives queries. Query mode vectors express selections, similarities, and analytics using FUNC tags for aggregation and sorting plus: $var bindings for reuse of limit values. Meta mode vectors (for example, % m lim 12;;) attach execution hints such as limits and offsets that are available both to the compiler and to subsequent limits as variables. By combining three indices (table, column, value) with MODE and FUNC annotations, this grammar extends the axial grammar of FIG. 24 to cover DDL, DQL, vector similarity, and analytic aggregation while continuing to compile in a single pass to deterministic intermediate forms such as SQL, vector-database requests, or other execution plans. Because all of these modes and annotations are expressed in the same Axis: 0 coordinate scheme, a single parser and analyzer can treat schema, queries, and execution metadata uniformly without switching representations.

In certain embodiments, a string encoded according to this grammar is translated to a conventional query language such as SQL. The matrix is walked to populate each clause of the SQL statement in a deterministic way, without the author needing to think in terms of SQL syntax. The very first Axis: 0:2 (e.g., % q movies) determines the FROM clause and following specified expressions in Axis: 0:2 populate the JOIN clause. The expressions in Axis: 0:1 populate the SELECT clause, optionally with aliases. Expressions in Axis: 0:0 annotated with grouping functions (e.g.,: grp) populate both the SELECT and GROUP BY clauses. Expressions with sorting functions, such as: asc and:des, in Axis: 0:0 populate the ORDER BY clause. Meta-configuration vectors, such as limit and offset parameters (om lim, % m beg), are translated into LIMIT and OFFSET clauses of the resulting SQL statement. The system automatically determines whether comparisons belong in the WHERE or HAVING clauses based on the limit's associated FUNCs. Non-aggregated limit comparisons are routed to WHERE, while limits with comparisons and aggregate FUNCs (such as: min,:max,:avg,: sum,:cnt,: last) are routed to HAVING.

In one embodiment, the position of sorting columns in the ORDER BY clause corresponds to position in the query string. In another embodiment, the sorting FUNCs comprise an integer N (such as: ascN and: desN) to denote position in the ORDER BY clause, thus avoiding having to rearrange position in the query string.

In one embodiment, the interpreter is implemented as an incremental stream parser that consumes an expression from a byte stream and yields partially constructed matrices as soon as their terminating matrix separator is observed. The Stream abstraction in the Python interpreter holds only a bounded look-ahead buffer, and each Matrix object is emitted to the host application as soon as it is syntactically complete. The application may begin compilation or execution of earlier matrices while later matrices are still being parsed, enabling overlapped parsing and execution in long-running or interactive sessions.

In some embodiments, incremental parsing is combined with partial execution: as each matrix is parsed into a Matrix->Vector->Limit lattice, the interpreter immediately rewrites it into an execution plan (for example, SQL, a vector-database request, or an in-memory filter pipeline) and begins executing that plan in a background thread or asynchronous task. Because the lattice representation is fully determined once the matrix is parsed, later text in the script cannot retroactively alter the plan, permitting deterministic streaming execution of large query batches or pipelines generated by an LLM.

In one embodiment, the interpreter emits structured diagnostics that associate each parse or semantic error with explicit lattice coordinates and token ranges. An error object includes the matrix index, vector index, limit index, token kind, and offending lexeme, as well as a machine-readable error code such as E_COL_NAME or E VAR BIND.

The following are illustrative examples of the extended grammar and syntax:

//All movies before 1970 ordered by year asc movies year: asc<1970;;;//

//Average performer rating at least 4.2 roles rating: avg>=4.2; actor:grp;;//

//Minimum role rating by actor, low to high roles rating: min: asc; actor:grp;;//

//Roles in movies mentioning robot rated 3+movies description <=> “robot” >=$sim; title;roles movie @; rating >=3;;

// Costars seen with Bruce Willis and Uma Thurman roles actor: $a~"Bruce Willis “, “Uma Thurman”;movie; @ @ @; actor! $a;;//

// War stories before 1980: top 12 movies by minimum role rating movies year <1980; description <=> “war” >=$sim; title: grp; roles movie @; rating:min : des; &m lim 12; ;//

Figure 26:
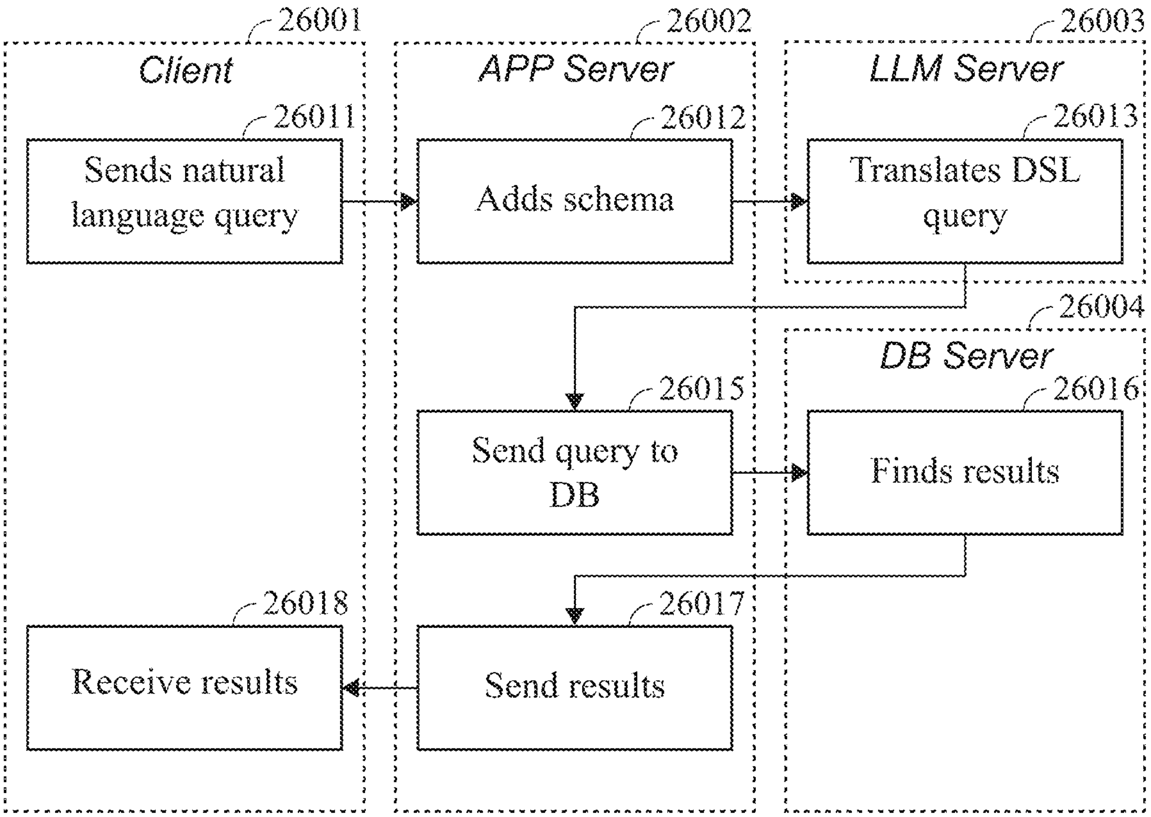
FIG. 26 illustrates a server configuration for LLM RAG.

// Roles for movies Hero or House of Flying Daggers where actor name includes Li, actor A-Z movies title “Hero”, “House of Flying Daggers”; roles movie @; actor: asc~ “Li”;;

FIG. 26 illustrates a server configuration and example flow for a large language model (LLM) retrieval-augmented generation (RAG) pipeline, in which a natural-language request from a client is converted into a domain-specific language (DSL) query and executed against a database to obtain results. In the illustrated embodiment, a client device 26001 communicates over a network with an application (APP) server 26002. The APP server 26002 communicates over a network with a large language model (LLM) server 26003, and a database (DB) server 26004. Network communications may use HTTP, gRPC, WebSockets, or another application-layer protocol and may include additional contextual metadata such as user identity, locale, or tenant identifier.

The client 26001 originates a user request by sending a natural-language query 26011, such as “Which customers purchased product X last quarter?”, to the APP server 26002.

Upon receiving the natural-language query 26011, the APP server 26002 prepares an augmented prompt by adding schema information 26012. In various embodiments, the schema operation 26012 includes serializing a portion of the datastore's schema-such as table names, column names, column types, relationships, or axial annotations-into a compact textual description and concatenating that description with the original natural-language query. The augmented prompt may further embed examples of valid DSL queries, reserved tokens, or error-handling constraints to steer the LLM toward syntactically correct and semantically meaningful output.

The APP server 26002 forwards the augmented prompt to the LLM server 26003, which performs a translation step 26013. In this step, the LLM server 26003 uses one or more large language models (or other neural network pattern) to convert the natural-language instruction and attached schema into a programmatic query expressed in a DSL. Optionally, the DSL is encoded according to an axial grammar like that of FIG. 24 or FIG. 25. For example, the LLM server 26003 may output a single axis-based query string or a sequence of such strings that together form a query plan, each query conforming to the Matrix->Vector->Limit described elsewhere in this specification. The LLM server 26003 returns the generated DSL query 26013 to the APP server 26002. In some embodiments, the APP server 26002 statically validates the DSL query 26013 against the schema used in step 26012, rejecting or repairing queries that reference nonexistent tables, columns, or relationships. This static validation detects schema errors before query execution, reducing failed database calls and improving end-to-end latency compared to systems that only validate after generating SQL or graph queries.

After validation, the APP server 26002 transmits the DSL query 26015 to the DB server 26004. In one embodiment, the DB server 26004 natively interprets the axial-grammar DSL and executes it directly over an underlying memetic datastore. In another embodiment, the APP server 26002 compiles the DSL query 26015 into one or more conventional execution plans such as SQL statements, vector-database nearest-neighbor requests, or graph-traversal pipelines before sending them. In another embodiment, the DB server 26004 compiles the DSL query at 26016 into one or more conventional execution plans. During execution, the DB server 26004 evaluates the query over one or more physical storage engines-such as relational tables, key-value stores, graph stores, or vector indices-to perform the “Finds results” operation 26016, thereby producing a structured result set that satisfies the constraints expressed by the DSL query.

Once the results have been computed, the DB server 26004 performs a "Send results" operation 26017 by returning the structured result set to the APP server 26002. The APP server 26002 "Receives results" 26018 and may optionally normalize, filter, or post-process the structured data. In certain embodiments, the APP server 26002 invokes the LLM server 26003 a second time to summarize the structured results into natural language, thereby closing the loop from natural-language query to DSL execution and back to a natural-language answer. In other embodiments, the APP server 26002 returns the raw DSL-native result representation directly to the client 26001 for consumption by another automated system.

In one embodiment, the APP server 26002 implements or hosts an artificial-intelligence (AI) agent that autonomously orchestrates some or all of the operations 26011-26018. The AI agent maintains an explicit representation of the current user goal, intermediate hypotheses, and available "tools," where each tool corresponds to a callable subsystem such as the LLM server 26003, the DB server 26004, a schema-introspection module, or a post-processing pipeline. Upon receiving the natural-language query 26011, the AI agent selects a tool invocation policy that may include: (i) constructing the augmented prompt and invoking the LLM server 26003 to obtain a DSL query; (ii) issuing one or more validation or rewrite passes over the returned DSL query; (iii) invoking the DB server 26004 with the validated DSL query or with a compiled conventional execution plan; and/or (iv) optionally re-invoking the LLM server 26003 to summarize the structured result set for return to the client 26001. The AI agent may perform multi-step reasoning, including decomposing a complex natural-language request into multiple sub-queries, sequencing multiple DSL queries and corresponding DB executions, monitoring tool outputs for errors or inconsistencies, and conditionally requesting clarification from the client 26001 (e.g., via follow-up questions) when the user intent is ambiguous. In some embodiments, the AI agent is itself implemented using a large language model or other neural network that is prompted with a description of the available tools and current dialog state and that emits structured tool-invocation commands; in other embodiments, the AI agent comprises a rule-based planner, finite-state machine, or other policy engine that encodes decision logic for routing requests among the LLM server 26003, the DB server 26004, and other services exposed by the system.

In certain embodiments, each of the APP server 26002, LLM server 26003, and/or DB server 26004 are hardware optimized for their specific tasks. The grammar and syntaxes disclosed above significantly reduce computations performed on the LLM server 26003 while having trivial impacts on the APP server 26002 and DB server 26004.

In some embodiments, the LLM server 26003 executes on a large-language-model-optimized accelerator, which may be implemented as a graphics processing unit (GPU), tensor processing unit (TPU), field-programmable gate array (FPGA), or other specialized integrated circuit. The accelerator comprises a plurality of parallel compute cores organized for SIMD/SIMT execution, vectorized execution units, and matrix-multiply-and-accumulate (MAC) or tensor cores configured to perform dense linear algebra operations, backed by an on-package high-bandwidth memory (HBM) subsystem and, in some cases, persistent memory (PMEM) tiers providing high aggregate bandwidth and capacity. The hardware and associated runtime (e.g., CUDA-or ROCm-class systems) are arranged to schedule kernels in warps and thread blocks with memory coalescing, shared-memory tiling, CUDA kernel fusion, and stream processing pipelines, leveraging asynchronous DMA, GPUDirect/RDMA transfers, and NUMA-aware host-memory allocation to overlap data movement and compute. In distributed deployments, multi-GPU nodes are connected via high-speed interconnects and kernel-bypass networking, and are orchestrated using data parallelism, model parallelism, and pipeline parallelism over a dataflow-computing execution graph, optionally including out-of-core computation for models or tensors that exceed device memory. This arrangement efficiently evaluates transformer-style neural networks including batched matrix multiplications, attention score computations, and non-linear activation functions—for both training and edge inference acceleration, thereby reducing end-to-end latency and power consumption for large language model workloads relative to general-purpose CPUs while enabling deterministic concurrency control over query and inference pipelines.

In some embodiments, the DB server 26004 executes on hardware optimized for database workloads, including multi-core CPUs with large caches, high-bandwidth memory channels, and high-IOPS non-volatile storage such as NVMe SSD arrays. The DB server 26004 may further employ storage controllers, RAID or erasure-coding modules, and network interfaces tuned for low-latency, high-throughput access to structured data, thereby accelerating scan, index, and join operations over large tables.

In some embodiments, the LLM server 26003 is stateless in that the server itself does not persist request data between requests. Optionally, the APP server 26002 includes data from one or more prior requests in a current request to the LLM server 26003 so that the LLM server 26003 can generate context-aware responses while remaining stateless. By contrast, the DB server 26004 is stateful in that it persists data from prior requests and uses the persisted data when responding to subsequent requests.

Although this figure depicts a single client 26001, APP server 26002, LLM server 26003, and DB server 26004 for clarity, the invention encompasses deployments in which each of these logical roles is horizontally scaled across multiple physical or virtual machines, implemented as containerized microservices, or co-located on a single device. Likewise, the steps labeled 26011, 26012, 26013, 26015, 26016, 26017, and 26018 may be performed synchronously or asynchronously, batched across multiple user requests, and reordered or combined where doing so still achieves the essential natural-language→LLM→DSL→results flow described.

EXAMPLE CODE

The attached computer code is one prototype embodiment of the present invention encoded in Python. However, the present invention may be encoded in any number of computer programming languages may utilize any number of database programs. Those skilled in the art will recognize the present invention is optionally embodied in a purpose-written database program.

Components of the Invention

The following describes some of the components variously used in certain embodiments of the present invention. Certain embodiments use additional components not listed here.

In one embodiment, notation described herein is parsed into an Abstract Syntax Tree (AST). AST is a tree representation of the abstract syntactic structure of text (often source code) written in a formal language. Each node of the tree denotes a construct occurring in the text.

In one embodiment, the present invention is delivered as an application programming interface (API) that exposes a stable set of local and network endpoints. These endpoints accept request objects, invoke the core processing pipeline, and return machine readable responses, thereby allowing external software to embed the functionality of the present invention without recompiling or linking native libraries.

In one embodiment, the present invention incorporates artificial intelligence (AI). Large language models such as GPT-3 by OpenAI, DALL-E, Stable Diffusion, MidJourney, and DeepMind systems are integrated to translate natural-language instructions into executable requests and to summarize structured results, providing conversational access and predictive analytics that enhance overall system performance.

In one embodiment, the present invention ingests audio data. Digital assets encoded in 3GP, AA, AAC, MP3, OGG, WAV, WMA, WEBM, or similar formats are stored together with descriptive metadata, enabling unified search, transformation, and analytics across multimedia and non-media data through the same processing framework.

In one embodiment, the present invention indexes Bitcoin (BTC) ledger information. Block headers, transactions, and outputs are transformed into structured records so that cryptographic proofs, balance checks, and historical queries execute within the same runtime that services conventional relational workloads.

In one embodiment, the present invention interfaces with blockchain networks, including but not limited to Ethereum, Polygon, Binance, Ripple, Cardano, Solana, Polkadot, Near, Avalanche, Litecoin, Monero, Optimism, and Lightning Network. By mapping blocks and timestamps into canonical data structures, the system performs cross-chain auditing, provenance tracking, and real-time analytics without external middleware.

In one embodiment, the present invention commits arbitrary application records to a blockchain ledger by serializing each record into a fixed-length tuple whose fields respectively identify the logical dataset, the record key, the attribute name, and the literal value, concatenating those fields into a fixed-bit payload, embedding the payload in the data region of a transaction output, and broadcasting the signed transaction to the peer to peer network. Each block that later confirms the transaction immutably anchors the tuple, and subsequent queries reconstruct the original record set by scanning the ledger for outputs bearing the dataset tag. Because the tuple ordering is deterministic and uniform, no external schema registry or off chain index is required, thereby enabling censorship resistant storage, verifiable audit trails, and atomic sharing of structured data among untrusted parties.

In one embodiment, the present invention manages blockchain addresses. Each hexadecimal identifier, such as 0x1234ABC, is stored alongside its corresponding public-key hash and balance metadata, allowing deterministic address resolution, transaction correlation, and risk scoring across multiple chains.

In one embodiment, the present invention executes blockchain smart contracts. Transactions targeting on-chain programs, for example Solidity contracts on Ethereum or Rust programs on Solana, are automatically constructed, signed, and submitted, and subsequent receipts are captured and recorded for deterministic replay, audit, and downstream processing.

In one embodiment, the present invention mints and manages blockchain tokens-coins or cryptocurrencies—that mirror asset state changes produced by its core processing pipeline. When the system records a qualifying event, it invokes an on-chain smart contract to issue a corresponding token conforming to widely adopted Ethereum standards such as ERC-20 fungible tokens, ERC-721 non-fungible tokens, or ERC-1155 semi-fungible tokens. Each token's immutable ledger entry acts as a cryptographic receipt that links ownership, provenance, and transactional metadata back to the off-chain dataset handled by the present invention, enabling verifiable asset tracking, automated royalty distribution, and permissioned access controls without relying on centralized intermediaries.

In one embodiment, the present invention incorporates a client, network client, or computer client, defined as a computing device that originates a service request across a network to a server executing the present invention. The client packages user credentials, payload data, or natural-language instructions into a protocol message, transmits that message over secure transport such as HTTPS or gRPC, and awaits a structured response that may include analytic results, authentication tokens, or blockchain transaction receipts. By offloading computationally intensive parsing, inference, and ledger interaction to the server, the client maintains a lightweight footprint suitable for browsers, mobile applications, embedded systems, and edge devices while still benefiting from the full functionality of the present invention through a stateless request-response paradigm.

In one embodiment, the present invention is realized as a synchronous digital circuit whose pipeline stages—request buffering, lexical decoding, semantic expansion, and result emission—are driven by a clock signal or logic signal. A square-wave clock generated by an on-chip oscillator provides a stable cadence, and each rising edge propagates tokens through flip-flops and latches that align the parser, comparator, and serializer units, thereby preventing race conditions during high-throughput streaming. For double data rate implementations, both the rising and falling edges are exploited to process separate halves of a request sentence in parallel, doubling effective bandwidth while maintaining deterministic timing. The constant-frequency clock also gates the optional GPU-launch sequencer and blockchain transaction engine, ensuring that off-chip bus handshakes occur at precise intervals, so the hardware embodiment of the present invention achieves low-latency, race-free operation across all synchronized subsystems.

In one embodiment, the present invention is delivered through cloud computing, allowing users to provision its full parsing, analytics, and ledger-interaction capabilities on demand over a wide-area network. A managed control plane spins up elastic compute instances, attaches high-throughput storage, and exposes secure HTTPS or gRPC endpoints so that clients can submit requests without maintaining local infrastructure. Autoscaling groups monitor workload metrics and automatically add or retire virtual machines, while container orchestration platforms such as Kubernetes or ECS deploy stateless microservices that host the core runtime, AI assistants, GPU kernels, and blockchain gateways. This cloud architecture provides pay-as-you-go elasticity, geographic redundancy, and continuous deployment, ensuring that the present invention scales seamlessly from a single proof-of-concept to global, high-availability production environments.

In one embodiment, the present invention incorporates a code generator that transforms the runtime's intermediate representation into an executable artifact suitable for downstream execution environments. Upon receiving a validated request, the generator emits target-specific source code, assembly, bytecode, or machine code, for example SQL statements for relational engines, CUDA kernels for parallel GPUs, or Solidity bytecode for blockchain smart contracts. The generated program is optimized in situ through constant folding, dead-path elimination, and register allocation informed by the deterministic structure of the intermediate form, after which it is compiled or linked by the appropriate toolchain and delivered for immediate execution. This integrated code-production capability allows the present invention to adapt its analytic and transactional workflows to heterogeneous hardware and software platforms without manual recoding, thereby providing a scalable, portable, and performance-tuned deployment path. An example code generator is the Hyperpiler disclosed in U.S. Pat. No. 10,942,709.

One embodiment of the present invention comprises a computer or computing device or computing system. A computer is a physical device comprising at least one computer-readable storage medium and at least one processor. A computer operates by reading input data from a computer-readable storage medium, reading instructions from a computer readable storage medium, and executing the input data and instructions with the processor to produce output data. Output data is typically stored in a computer-readable storage medium and/or outputted to a user. Computer form factors include desktops, laptops, smart phones, smart watches, and servers.

One embodiment of the present invention comprises a computer network or network. A computer network is two or more computers communicating. Network data may be sent as electric pulses over copper wire, light pulses over optical fiber, and/or radio waves over the air.

One embodiment of the present invention comprises a computer-readable storage medium or computer data storage medium or CRSM or storage. A computer-readable storage medium is a physical device containing input data and/or instructions for use by a computer. Common CRSMs include hard drives (HDD), solid state drives (SSD), flash drives, tape drives, magnetic tape, Compact Discs (CD), Digital Video Discs (DVD), Blu-ray® discs, optical drives, floppy disks, zip drives, random access memory (RAM), read only memory (ROM), and punch cards.

One embodiment of the present invention comprises a convolutional neural network or ConvNet or CNN. A convolutional neural network is a class of artificial neural network (ANN), most commonly applied to analyze visual imagery.

One embodiment of the present invention comprises CRUD or create/read/update/delete or manipulate. CRUD are the four basic operations on stored data. In SQL, these terms typically correspond to INSERT, SELECT, UPDATE, and DELETE. In HTTP, these terms typically correspond to POST, GET, PUT, DELETE.

One embodiment of the present invention comprises cryptography. Cryptography is the practice and study of techniques for secure communication in the presence of adversarial behavior. In computer science, common cryptographic techniques include Diffie-Hellman, X.509, Rivest-Shamir-Adleman (RSA), and Elliptic-curve cryptography (ECC), and Elliptic Curve Digital Signature Algorithm (ECDSA).

In one embodiment, the present invention integrates an adaptive data-compression layer that reduces the size of payloads, intermediate tensors, and returned result sets before they are transmitted across networks, written to cloud object stores, or embedded in blockchain transactions. The layer selects the most appropriate codec on the fly-such as ZIP, GZIP, LZ4, Brotli, or Snappy-using heuristics derived from content type and latency constraints. By shrinking message footprints, the compression subsystem lowers bandwidth usage, shortens end-to-end response time, and cuts storage and gas costs while preserving bit-exact fidelity when required, thereby enhancing the overall efficiency and scalability of the present invention.

In one embodiment, the present invention operates in conjunction with a database management system such as MySQL, PostgreSQL, SQLite, MariaDB, Couchbase, Redis, MongoDB, or HBase, the DBMS manipulating an organized set of data stored on a computer-readable medium. Within this environment the database contains one or more tables, each table being an ordered collection of rows, each row (also called a tuple) comprising one value per column, and each value representing a single cell. A column is therefore the homogeneous set of values that occupies a common position in every row, while a cell is the intersection of a specific row and column. The DBMS exposes query and update operations that the present invention invokes to read, write, and transform these cells in service of its higher-level functionality.

One embodiment of the present invention comprises a database right. A database right is a sui generis property right, comparable to but distinct from copyright, that exists to recognize the investment that is made in compiling a database, even when this does not involve the creative aspect that is reflected by copyright. Such rights are often referred to in the plural: database rights. The Agreement on Trade-Related Aspects of Intellectual Property Rights (TRIPS) Agreement requires that copyright protection extends to databases and other compilations if they constitute intellectual creation by virtue of the selection or arrangement of their contents, even if some or all of the contents do not themselves constitute materials protected by copyright.

One embodiment of the present invention comprises deterministic finite automaton (DFA) parsing. Lexical and certain syntactic phases are implemented as DFAs over the token stream, providing predictable, linear-time parsing without backtracking. This deterministic behavior improves throughput and simplifies hardware or GPU implementations.

One embodiment of the present invention comprises a download. A download is the transmission of data from a server computer to a client computer over a network.

One embodiment of the present invention comprises Ethernet. Ethernet is a family of wired computer networking technologies commonly used in local area networks (LAN), metropolitan area networks (MAN) and wide area networks (WAN).

In one embodiment, the present invention employs hash functions to convert variable-length input into fixed-length digests that secure data integrity, drive content-addressable storage, and accelerate index lookups. When the system stores payloads, serializes transactions, or transmits information over untrusted links, it invokes software or hardware implementations of standard hashes such as Secure Hash Algorithm 2 (SHA-2), Message Digest Algorithm 5 (MD5), and the 32-bit Cyclic Redundancy Check (CRC-32). The resulting digests allow receivers to confirm that a payload has not been altered in transit and permit the runtime to deduplicate identical objects without reprocessing their full contents, thereby increasing throughput and reducing storage overhead.

One embodiment of the present invention comprises HTML or HyperText Markup Language. HTML is the standard markup language for displaying documents in a web browser.

One embodiment of the present invention comprises incremental compilation. The system compiles queries and DSL fragments into IR and execution plans in small units, reusing previously compiled segments when portions of a script or pipeline are modified. This yields lower latency for interactive workloads and long-running sessions.

One embodiment of the present invention comprises an IDE or integrated development environment. An IDE is a software application that provides comprehensive facilities to computer programmers for software development, typically consisting of a source code editor, build automation tools, and a debugger.

One embodiment of the present invention comprises an input device. An input device is a physical device which initiates a computer execution. Such execution includes storing data, storing instructions, and/or selecting instructions and data to execute in the future. Input devices include computer keyboards, keypads, computer mice, touch screens, microphones, cameras, card readers, scanners, bar code readers, chip readers, magnetic tape readers, network modem (wired or wireless), and Bluetooth® receiver.

One embodiment of the present invention comprises an intermediate representation (IR). The IR encodes parsed queries and memetic operations in a machine-oriented, storage-engine-agnostic form, such as the Matrix-Vector-Limit lattice. This IR allows the system to apply optimization passes and emit code such as SQL, SPARQL, graph traversals, or GPU kernels from a single canonical structure.

One embodiment of the present invention comprises the Internet. The Internet is the global system of interconnected computer networks that uses the TCP/IP protocol to communicate.

One embodiment of the present invention comprises an Internet Protocol address or IP address. An Internet Protocol address is a unique number identifying a computer connected to the Internet. Internet Protocol version 4 (IPv4) addresses comprise 32 bits. Internet Protocol version 6 (IPv6) addresses comprise 128 bits.

One embodiment of the present invention comprises the IoT or Internet of Things. The IoT describes physical objects with sensors, processing ability, software and other technologies that connect and exchange data with other devices and systems over the Internet or other communications networks.

In one embodiment, the present invention integrates a knowledge graph-a graph-structured knowledge base that represents data as interconnected nodes and edges, thereby capturing rich semantics, relationships, and ontologies among objects, events, situations, and abstract concepts. By expressing facts in this topology, the system enables context-aware reasoning, entity resolution, and inference over large, heterogeneous datasets. Popular frameworks that illustrate the paradigm include the Vadalog reasoning engine, Google's Freebase, the YAGO ontology, and the W3C-standard Resource Description Framework (RDF); the present invention adopts compatible serialization formats so it can ingest, enrich, and query external knowledge sources with minimal transformation.

One embodiment of the present invention comprises a language model or large language model (LLM). A language model is a probability distribution over sequences of words. Given any sequence of words, a language model assigns a probability to the whole sequence. Language models are often used to respond in human language to a human language prompt. GPT-3 is an example language model.

One embodiment of the present invention comprises linear regression. Linear regression is a linear approach for modelling the relationship between a scalar response and one or more explanatory variables (also known as dependent and independent variables). The case of one explanatory variable is called simple linear regression; for more than one, the process is called multiple linear regression.

One embodiment of the present invention comprises low code or no code. Low code describes a software development process by which a computer program executes computer instructions according to non-code input from a user, typically inputted though a graphical user interface. Ideally, a no code program allows a user to design a computer program without knowing complicated code syntax.

One embodiment of the present invention comprises machine learning or ML. Machine learning algorithms build a model based on sample data, known as training data, in order to make predictions or decisions without being explicitly programmed to do so. Machine learning algorithms are used in a wide variety of applications, such as in medicine, email filtering, speech recognition, agriculture, and computer vision, where it is difficult or unfeasible to develop conventional algorithms to perform the needed tasks.

One embodiment of the present invention comprises a markup language. A markup language is a syntax for annotating a document in a way that is visually distinguishable from the content. Markup languages typically do not contain executable instructions. Example markup languages include HTML, LaTeX, and Markdown.

One embodiment of the present invention comprises metadata. Metadata is data that provides information about other data, but not the content of the data itself. Metadata may describe the format, size, compression, authorship, ownership, copyright, legal, creation date, modification date, ordering, keywords, permissions, or other information about the primary data.

One embodiment of the present invention comprises a microprocessor. A microprocessor is a special case processor that converts a digital electric input signal into a digital electric output signal through a clock-driven integrated circuit comprising logic gates. Example commercial microprocessors include the Intel 4004, the Intel Pentium line, the IBM PowerPC line, and the Motorola 68000. One species of processor is a graphics processing unit (GPU), designed to accelerate computer graphics and commonly used in calculations such as matrix multiplication for neural networks. Another species of processor is a tensor processing unit (TPU), designed to accelerate matrix multiplication for neural networks.

One embodiment of the present invention comprises a mobile application or mobile app. A mobile application is an application that runs on a portable computer. Example mobile application operating systems include Apple iOS and Google Android.

One embodiment of the present invention comprises multimedia. Multimedia computer file formats include DOC, DOCX, FLV, HTML, ODP, PDF, PPT, and PPTX.

In one embodiment, the present invention is deployed on a multitenant computer system, meaning a single physical or virtual server runs the same software stack for multiple discrete tenants-whether separate companies or independent developer groups within one enterprise. Tenant isolation is enforced through namespace partitioning, dedicated authentication realms, and role-based access controls, while shared compute, memory, and network pools are dynamically scheduled to maximize hardware utilization. This multi-tenant architecture enables the present invention to offer cost-efficient, scalable service instances without deploying separate infrastructure per tenant, yet guarantees that the activities of one tenant cannot compromise the confidentiality, integrity, or availability of another tenant's workloads.

One embodiment of the present invention comprises a network protocol or protocol. A network protocol is a predefined signal syntax allowing two computers to communicate over a network. Protocols may be implemented by software, hardware, or both. Protocols are typically 'layered,' wherein more specific protocols are transmitted within more generic protocols. Example protocols include Address Resolution Protocol (ARP), Internetwork Packet Exchange (IPX), Transmission Control Protocol (TCP), Internet Protocol (IP), User Datagram Protocol (UDP), HyperText Transfer Protocol (HTTP), Secure Socket Layer (SSL), Transport Layer Security (TLS), File Transport Protocol (FTP), Secure File Transport Protocol (SFTP), Secure Shell (SSH), Telnet, Domain Name System (DNS). Internet Control Message Protocol (ICMP), NetBIOS, Remote Procedure Call (RPC), Internet Relay Chat (IRC), Network Time Protocol (NTP), Internet Message Access Protocol (IMAP), Post Office Protocol (POP), and Simple Mail Transfer Protocol (SMTP).

One embodiment of the present invention comprises a network router or router. A network router is a networking device that forwards data packets between computer networks. A router may itself be a computer.

One embodiment of the present invention comprises a network switch or switch or switching hub or bridging hub. A network switch is a networking device that connects other devices on a computer network by using packet switching to receive and forward data to the destination device.

One embodiment of the present invention comprises a neural network or NN or artificial neural network or ANN. A neural network is a computing system inspired by the biological neural network, typically comprising layers of neurons interconnected by synapses.

One embodiment of the present invention comprises NLP or natural language processing. NLP is the interdisciplinary subfield of linguistics, computer science, and artificial intelligence concerned with the interactions between computers and human language, in particular how to program computers to process and analyze large amounts of natural-language data.

One embodiment of the present invention comprises an operating system or OS. An operating system is system software that manages computer hardware and software resources, and provides common services for computer programs. Example operating systems include Linux, Unix, Apple iOS, Apple MacOS, and Microsoft Windows.

One embodiment of the present invention comprises parser combinators. Parser combinators are higher-order functions that compose small parsing primitives into full grammars for the various DSLs described herein. This approach allows the system to extend or specialize front-end syntax without rewriting a monolithic parser.

One embodiment of the present invention comprises a processor. A processor is a physical device that deterministically executes input signals into output signals. Signals are typically electric. Signals may be digital or analog.

One embodiment of the present invention comprises a program or computer program or piece of software or software program or computer application or application or app. A program is a distinct document of software. A program may reference and execute other programs. Example programs include Microsoft Word™, WordPress®, Apple iOS™, and SQLite.

One embodiment of the present invention comprises a program specification or specification. A program specification is a data document describing the desired function of a computer program. A specification is typically processed by a code generator to output a computer program. Example specification encoding syntaxes include UML, XML, and JSON.

One embodiment of the present invention comprises a programming language. A programming language is a formal language comprising a set of strings that instruct a computer processor. There are a number of programming languages, each having a specific syntax to encode instructions. Programming languages are typically compiled to machine code for execution at the processor. Example programming languages include: ASP, BASIC, C, C#, C++, COBOL, Datalog, Erlang, Go, Haskell, Java, JavaScript, Lisp, Objective-C, Perl, Prolog, Python, PHP, Ruby, Rust, Scala, Solidity, and Vyper.

One embodiment of the present invention comprises public-key cryptography or asymmetric cryptography. Public-key cryptography is the field of cryptographic systems that use pairs of related keys. Each key pair consists of a public key and a corresponding private key. Key pairs are generated with cryptographic algorithms based on mathematical problems termed one-way functions. Security of public-key cryptography depends on keeping the private key secret; the public key can be openly distributed without compromising security.

One embodiment of the present invention comprises a recurrent neural network or RNN. A recurrent neural network is a class of artificial neural network (ANN) where connections between nodes can create a cycle, allowing output from some nodes to affect subsequent input to the same nodes.

One embodiment of the present invention comprises relational algebra. Relational algebra is a theory that uses algebraic structures for modeling data, and defining queries on it with well founded semantics. The theory was introduced by Edgar F. Codd.

One embodiment of the present invention comprises a REST or representational state transfer. A REST is an API design in which a client sends an HTTP request to a server which responds with structured data in XML, JSON, similar format.

One embodiment of the present invention comprises a search engine. A search engine is a computer program designed to search documents, typically across the World Wide Web. Example search engines include Microsoft Bing, Google, and DuckDuckGo.

One embodiment of the present invention comprises a server or web server or network server. A server is a special case computer optimized for receiving requests and sending responses over a computer network.

One embodiment of the present invention comprises SHapley Additive explanations or SHAP. SHAP is a mathematical method to explain the predictions of machine learning models. It is based on the concepts of game theory and can be used to explain the predictions of any machine learning model by calculating the contribution of each feature to the prediction.

One embodiment of the present invention comprises social media. Social media comprises interactive technologies that facilitate the creation and sharing of information, ideas, interests, and other forms of expression through virtual communities and networks. Examples include Facebook, Twitter, and YouTube.

One embodiment of the present invention comprises a social network or social networking service. A social network is a computer program storing relationships between users, typically including features such as messaging, blogging, or picture uploading. Such services include Blogger, Chess.com, ClassDojo, Discord, Facebook, GitHub, Instagram, Medium, Pinterest, Quora, Reddit, Remind, Snapchat, Stack Overflow, Steam, Telegram, TikTok, Twitch, Twitter, WeChat, WhatsApp, Wikipedia, Yammer, YouTube, and similar.

One embodiment of the present invention comprises software or computer software or computer code or code. Software is instructions stored on a computer-readable storage medium to be executed by a computer processor.

One embodiment of the present invention comprises source ranking. Source ranking is the process of ranking the importance of various training source data in explaining the output of a neural network. For example, a neural network generates a song lyric and, when queried, displays a list of websites containing similar song lyrics as a source ranking.

One embodiment of the present invention comprises SPARQL. SPARQL is a query language for querying RDF databases.

One embodiment of the present invention comprises a spreadsheet. A spreadsheet is a document containing human-readable data structured in rows and columns.

One embodiment of the present invention comprises a spreadsheet program. A spreadsheet program is a special case program for manipulating spreadsheets.

One embodiment of the present invention comprises SQL or Structured Query Language. SQL is a domain-specific computer language for manipulating data in a relational database management system.

One embodiment of the present invention comprises symbolic-neural hybrid systems and neuro-symbolic integration. In such embodiments, symbolic memetic structures (ARB triples, axial queries, and logic rules) interoperate with neural components such as large language models or embedding models, allowing neural networks to propose, score, or complete symbolic queries while symbolic logic constrains and validates neural outputs. This tight integration enables the system to combine high-level reasoning and schema guarantees with robust pattern recognition and generalization from unstructured data.

One embodiment of the present invention comprises a training source. A training source is a data source which is used in the training of a neural network. Training sources can be in a number of media including text, image, video, audio, or other multimedia. A common type of training source is a website.

One embodiment of the present invention comprises a transformer. A transformer is a deep learning model that adopts the mechanism of self-attention, differentially weighting the significance of each part of the input data. It is used primarily in the fields of natural language processing and computer vision.

One embodiment of the present invention comprises a tuple. A tuple is a data structure comprising a list of elements, including enumerated arrays and associative arrays.

One embodiment of the present invention comprises a URL or uniform resource locator or web address. An URL is a reference to a web resource that specifies its location on a computer network and a mechanism for retrieving it. A typical URL could have the form http://www.example.com/index.html, which indicates a protocol (http), a hostname (www.example.com), and a file name (index.html).

One embodiment of the present invention comprises a user. A user is an entity initiating an execution on a computer. Typically, a user is a human interacting with an input device. Alternatively, a user is a second computer programmed to interact with the former computer.

One embodiment of the present invention comprises video. Video computer file formats include 3GP, AVI, FLV, GIF, MOV, MP2, MP4, WEBM, WMV, and similar.

One embodiment of the present invention comprises a virtual machine. A virtual machine is a virtualization/emulation of a computer system. Virtual machines are based on computer architectures and provide functionality of a physical computer. Their implementations may involve specialized hardware, software, or a combination.

One embodiment of the present invention comprises virtual reality or VR. Virtual reality is a simulated experience that employs pose tracking and 3D near-eye displays to give the user an immersive feel of a virtual world. Applications of virtual reality include entertainment (particularly video games), education (such as medical or military training) and business (such as virtual meetings). Other distinct types of VR-style technology include augmented reality and mixed reality, sometimes referred to as extended reality or XR, although definitions are currently changing due to the nascence of the industry.

One embodiment of the present invention comprises a web browser or browser or Internet browser. A web browser is a program for browsing the World Wide Web. A typically browser function is to download and render a webpage comprising HTML, JavaScript, and/or CSS. Example web browsers include Microsoft® Internet Explorer®, Microsoft Edge®, Google® Chrome™, Apple® Safari®, and Mozilla® Firefox®.

One embodiment of the present invention comprises a webhost or web host. A webhost is a special case cloud provider specializing in serving documents on the World Wide Web.

One embodiment of the present invention comprises a webpage or web page. A webpage is an HTML document on the World Wide Web.

One embodiment of the present invention comprises a website or web site. A website is a group of related web pages controlled by one legal person.

One embodiment of the present invention comprises a word processor. A word processor is a program for humans to compose human-readable documents.

One embodiment of the present invention comprises the World Wide Web or WWW or web. The World Wide Web is an information network of hyperlinked documents transmitted from web servers to client web browsers over the Internet using the HTTP protocol invented by Sir Timothy Berners-Lee in 1989 at CERN. Transmitted documents typically comprise HTML, CSS, and JavaScript.

One embodiment of the present invention comprises zero-knowledge proof or ZK proof. Zero-knowledge proof is the process by which one party (the prover) can prove to another party (the verifier) that a given statement is true while the prover avoids conveying any additional information apart from the fact that the statement is indeed true. A non-interactive zero-knowledge proof requires no interaction between the prover and verifier. These cryptographic techniques are used to bundle transactions on blockchains. Examples include NIZK, zk-SNARK, and zk-STARK.

I claim as my invention the following:

1. A non-transitory computer-readable storage medium storing instructions that, when executed by one or more processors, cause the one or more processors to perform operations comprising:

receiving an input string;

parsing the input string into a plurality of tokens, at least one token being a relative token;

associating each token with a coordinate tuple having at least two coordinates;

associating the relative token with at least one referenced coordinate tuple according to the relative token's coordinate tuple and at least one predefined relative coordinate offset;

retrieving a first value associated with the referenced coordinate tuple;

performing a datastore operation using the first value and a comparison operator to retrieve a plurality of data entities; and outputting the plurality of data entities.

2. The non-transitory computer-readable storage medium of claim 1, wherein the coordinate tuple comprises a vector coordinate and a limit coordinate.

3. The non-transitory computer-readable storage medium of claim 2, wherein the relative coordinate offset is the same limit coordinate index and the preceding vector coordinate index.

4. The non-transitory computer-readable storage medium of claim 3, wherein the coordinate tuple further comprises a matrix coordinate index, and the relative coordinate offset is the preceding matrix coordinate index, the last vector coordinate index of the preceding matrix, and the same limit coordinate index.

5. The non-transitory computer-readable storage medium of claim 1, wherein at least one of the relative token or a token representing the comparison operator is omitted from the input string and inferred by the parser.

6. A non-transitory computer-readable storage medium storing instructions that, when executed by one or more processors, cause the one or more processors to perform operations comprising:

receiving an input string;

parsing the input string into a plurality of tokens;

associating each of at least three tokens from the plurality of tokens with a coordinate tuple comprising at least a first coordinate index and a second coordinate index;

counting a number of distinct second coordinate indices for each first coordinate index;

determining that a targeted first coordinate index has fewer distinct second coordinate indices than a precedent first coordinate index;

selecting a precedent token whose first coordinate index equals the precedent first coordinate index and whose second coordinate index is absent from any coordinate tuple whose first coordinate index equals the targeted first coordinate index; and writing a carried-forward token corresponding to the precedent token and associated with a coordinate tuple comprising the targeted first coordinate index and the second coordinate index of the precedent token.

7. The non-transitory computer-readable storage medium of claim 6, wherein the first coordinate corresponds to vector and the second coordinate corresponds to limit.

8. The non-transitory computer-readable storage medium of claim 6, wherein the precedent first coordinate index corresponds to the vector immediately preceding the targeted first coordinate index.

9. A non-transitory computer-readable storage medium storing instructions that, when executed by one or more processors, cause the one or more processors to perform operations comprising:

receiving an input string encoded according to an axial grammar having a first separator token and a second separator token;

parsing the input string into a plurality of tokens and mapping the tokens into a multidimensional lattice according to positions of instances of the first separator token and the second separator token;

retrieving data from a datastore by evaluating constraints encoded in the multidimensional lattice; and outputting an output string comprising data from the datastore encoded according to the axial grammar, wherein the output string is a valid input string.

10. The non-transitory computer-readable storage medium of claim 9, wherein the input string further comprises a relative token that, when parsed into the multidimensional lattice, is associated with a first lattice coordinate and references a second lattice coordinate different from the first lattice coordinate.

11. A computer-implemented method for performing large language model retrieval-augmented generation with an axial grammar, comprising:

receiving a natural-language input describing a desired behavior;

providing the natural-language input to a large language model trained on text paired with axial grammar code;

generating, by the large language model, a sequence of tokens conforming to the axial grammar, the sequence comprising at least a first separator token marking a first dimension and a second separator token marking a second dimension;

parsing the axial grammar code into a multidimensional lattice according to a position of the first separator token and a position of the second separator token;

retrieving data from a datastore by evaluating constraints encoded in the multidimensional lattice; and outputting an output string comprising data from the datastore.

12. The computer-implemented method of claim 11, wherein the large language model is processed on at least one graphics processing unit and the datastore is stored on a storage array comprising a plurality of non-volatile computer-readable storage media configured in a redundant array.

13. The computer-implemented method of claim 11, wherein the large language model is processed on at least one tensor processing unit and the datastore is stored on a storage array comprising a plurality of non-volatile computer-readable storage media configured in a redundant array.

14. The computer-implemented method of claim 11, wherein parsing the axial grammar code into a multidimensional lattice further comprises parsing a relative token that is associated with a first lattice coordinate and references a second lattice coordinate different from the first lattice coordinate.

15. The computer-implemented method of claim 14, wherein the multidimensional lattice comprises indices corresponding to a table identifier, row identifier, and value constraint.

* * * * *